(12) United States Patent
Ivkovich

(10) Patent No.: US 12,246,399 B2
(45) Date of Patent: Mar. 11, 2025

(54) SYSTEMS AND METHODS FOR PART TRACKING USING MACHINE LEARNING TECHNIQUES

(71) Applicant: ILLINOIS TOOL WORKS INC., Glenview, IL (US)

(72) Inventor: Stephen Paul Ivkovich, Hanover, MI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 820 days.

(21) Appl. No.: 17/238,667

(22) Filed: Apr. 23, 2021

(65) Prior Publication Data

US 2021/0402523 A1    Dec. 30, 2021

Related U.S. Application Data

(60) Provisional application No. 63/043,854, filed on Jun. 25, 2020.

(51) Int. Cl.
*B23K 31/12* (2006.01)
*B23K 31/00* (2006.01)
(Continued)

(52) U.S. Cl.
CPC .......... *B23K 31/125* (2013.01); *B23K 31/006* (2013.01); *G06N 3/04* (2013.01); *G06N 20/00* (2019.01)

(58) Field of Classification Search
CPC ...... B23K 31/125; B23K 31/006; B23K 9/32; G06N 3/04; G06N 20/00; G06N 3/08; G06N 20/10
See application file for complete search history.

(56) References Cited

U.S. PATENT DOCUMENTS 4,375,026 A    2/1983    Kearney
5,221,825 A    6/1993    Siewert
(Continued)

FOREIGN PATENT DOCUMENTS

CA    2356304    2/2001
CN    101193723    6/2008
(Continued)

OTHER PUBLICATIONS

Yuan Bao, et. al., "Massive Sensor Data Management Framework in Cloud Manufacturing Based on Hadoop", IEEE, Jul. 25, 2012, pp. 397-401 (Y type reference).
(Continued)

*Primary Examiner* — Robert G Bachner
(74) *Attorney, Agent, or Firm* — McAndrews, Held & Malloy, Ltd.

(57) ABSTRACT

Systems and methods for part tracking using machine learning techniques are described. In some examples a part tracking system analyzes feature characteristics related to one or more welds to identify, determine characteristics of, and/or label one or more parts repeatedly assembled by the welds. Identifying parts assembled from the welds may make it possible to do part based analytics (e.g., related to part quality, cost, production efficiency, etc.), as opposed to just weld based analytics, on past welding data. Additionally, identifying a part assembled from several welds results in an ordering of those several welds used to create the part, which can make it easier to compare/contrast similar welds across parts. Further, determining the characteristics of the parts can assist in configuring certain part tracking systems, thereby reducing the expertise, time, and personnel required.

20 Claims, 13 Drawing Sheets

(51) Int. Cl.
  *G06N 3/04* (2023.01)
  *G06N 20/00* (2019.01)

(56) References Cited

U.S. PATENT DOCUMENTS

| | | | |
|---|---|---|---|
| 5,714,734 | A | 2/1998 | Peterson et al. |
| 5,756,967 | A | 5/1998 | Quinn et al. |
| 6,362,456 | B1 | 3/2002 | Ludewig |
| 6,484,584 | B2 | 11/2002 | Johnson et al. |
| 6,583,386 | B1 | 6/2003 | Ivkovich |
| 6,624,388 | B1 | 9/2003 | Blankenship et al. |
| 6,636,776 | B1 | 10/2003 | Barton et al. |
| 6,795,778 | B2 | 9/2004 | Dodge et al. |
| 6,815,640 | B1 | 11/2004 | Spear et al. |
| 7,159,753 | B2 | 1/2007 | Subrahmanyam |
| 7,375,304 | B2 | 5/2008 | Kainec et al. |
| 7,574,172 | B2 | 8/2009 | Clark et al. |
| 7,643,890 | B1 | 1/2010 | Hillen et al. |
| 7,687,741 | B2 | 3/2010 | Kainec et al. |
| 7,772,524 | B2 | 8/2010 | Hillen et al. |
| 7,873,495 | B2 | 1/2011 | Lindell |
| 8,224,881 | B1 | 7/2012 | Spear et al. |
| 8,274,013 | B2 | 9/2012 | Wallace |
| 8,354,614 | B2 | 1/2013 | Ma |
| 8,355,805 | B2 | 1/2013 | Ricket |
| 8,592,723 | B2 | 11/2013 | Davidson et al. |
| 8,657,605 | B2 | 2/2014 | Wallace |
| 8,847,115 | B2 | 9/2014 | Casner et al. |
| 9,193,004 | B2 | 11/2015 | Enyedy et al. |
| 9,266,182 | B2 | 2/2016 | Hung |
| 9,321,133 | B2 | 4/2016 | Fischer et al. |
| 9,415,514 | B2 | 8/2016 | Geheb et al. |
| 9,449,498 | B2 | 9/2016 | Dina et al. |
| 9,481,045 | B2 | 11/2016 | Spear |
| 9,498,839 | B2 | 11/2016 | Hillen et al. |
| 9,514,421 | B2 | 12/2016 | Mullin |
| 9,665,093 | B2 | 5/2017 | Lamers et al. |
| 9,669,484 | B2 | 6/2017 | Holverson et al. |
| 9,684,303 | B2 | 6/2017 | Lamers et al. |
| 9,704,140 | B2 | 7/2017 | Lamers et al. |
| 9,724,787 | B2 | 8/2017 | Becker et al. |
| 9,773,429 | B2 | 9/2017 | Boulware |
| 9,821,400 | B2 | 11/2017 | Hillen et al. |
| 9,836,994 | B2 | 12/2017 | Kindig et al. |
| 9,862,048 | B2 | 1/2018 | Holverson et al. |
| 9,862,049 | B2 | 1/2018 | Becker |
| 9,889,517 | B2 | 2/2018 | Lambert et al. |
| 9,937,577 | B2 | 4/2018 | Daniel |
| 9,937,578 | B2 | 4/2018 | Becker et al. |
| 9,965,973 | B2 | 5/2018 | Peters et al. |
| 9,975,196 | B2 | 5/2018 | Zhang et al. |
| 9,993,890 | B2 | 6/2018 | Denis et al. |
| 10,010,959 | B2 | 7/2018 | Daniel |
| 10,012,962 | B2 | 7/2018 | Lamers et al. |
| 10,032,388 | B2 | 7/2018 | Sommers et al. |
| 10,065,260 | B2 | 9/2018 | Hutchison |
| 10,099,308 | B2 | 10/2018 | Vogel |
| 10,144,080 | B2 | 12/2018 | Chantry et al. |
| 10,183,351 | B2 | 1/2019 | Peters |
| 10,204,406 | B2 | 2/2019 | Becker et al. |
| 10,213,862 | B2 | 2/2019 | Holverson et al. |
| 10,242,317 | B2 | 3/2019 | Barhorst et al. |
| 10,688,584 | B2 | 6/2020 | Starzengruber |
| 10,722,969 | B2 | 7/2020 | Ulrich |
| 11,103,948 | B2 | 8/2021 | Holverson |
| 11,347,191 | B2 | 5/2022 | Hsu |
| 2006/0169682 | A1 | 8/2006 | Kainec et al. |
| 2008/0124968 | A1 | 5/2008 | Kirk |
| 2009/0173726 | A1 | 7/2009 | Davidson et al. |
| 2010/0152554 | A1 | 6/2010 | Steine et al. |
| 2012/0248081 | A1 | 10/2012 | Hutchison |
| 2013/0075380 | A1 | 3/2013 | Albrech et al. |
| 2013/0105556 | A1 | 5/2013 | Abell |
| 2013/0178953 | A1 | 7/2013 | Wersborg |
| 2013/0189658 | A1 | 7/2013 | Peters |
| 2013/0212512 | A1 | 8/2013 | Frenz |
| 2014/0047107 | A1 | 2/2014 | Maturana |
| 2014/0131320 | A1 | 5/2014 | Hearn et al. |
| 2014/0332514 | A1 | 11/2014 | Holverson et al. |
| 2014/0337429 | A1 | 11/2014 | Asenjo |
| 2015/0069112 | A1 | 3/2015 | Abou-Nasr et al. |
| 2017/0032281 | A1 | 2/2017 | Hsu |
| 2017/0036288 | A1 | 2/2017 | Albrecht |
| 2017/0072496 | A1 | 3/2017 | Falde et al. |
| 2017/0072497 | A1 | 3/2017 | Ivkovich |
| 2017/0185058 | A1 | 6/2017 | Holverson et al. |
| 2018/0032066 | A1 | 2/2018 | Enyedy et al. |
| 2018/0178320 | A1 | 6/2018 | Webster |
| 2018/0350056 | A1 | 12/2018 | Cardenas Bernal |
| 2019/0019061 | A1 | 1/2019 | Trenholm et al. |
| 2019/0022787 | A1 | 1/2019 | Daniel |
| 2019/0084069 | A1 | 3/2019 | Daniel et al. |
| 2019/0160601 | A1 | 5/2019 | Daniel |
| 2019/0163172 | A1 | 5/2019 | Daniel et al. |
| 2020/0130089 | A1* | 4/2020 | Ivkovich .............. B23K 9/1062 |
| 2020/0261997 | A1* | 8/2020 | Daniel ............... G05B 19/4183 |

FOREIGN PATENT DOCUMENTS

| | | |
|---|---|---|
| CN | 101329169 | 12/2008 |
| CN | 101374627 | 2/2009 |
| CN | 102528227 | 7/2012 |
| CN | 102596476 | 7/2012 |
| CN | 102922089 A | 2/2013 |
| CN | 103331506 | 10/2013 |
| CN | 103846915 | 6/2014 |
| CN | 103862135 | 6/2014 |
| CN | 103874965 | 6/2014 |
| CN | 103909325 | 7/2014 |
| CN | 104379291 | 2/2015 |
| CN | 104520046 | 4/2015 |
| CN | 104551372 | 4/2015 |
| CN | 104768694 | 7/2015 |
| CN | 106104587 | 11/2016 |
| CN | 107154950 | 9/2017 |
| CN | 107155317 | 9/2017 |
| CN | 107635710 | 1/2018 |
| CN | 107848083 | 3/2018 |
| CN | 108027911 | 5/2018 |
| DE | 102009016798 A1 | 10/2010 |
| WO | 0109723 | 2/2001 |
| WO | 2012000650 | 1/2012 |
| WO | 2013160745 | 10/2013 |
| WO | 2014149786 A1 | 9/2014 |
| WO | 2018080994 | 5/2018 |

OTHER PUBLICATIONS

European Patent Office, Office Action, No. 20192803.3, mailed Feb. 11, 2022.

The welding system of the future is self-learning (Mar. 20, 2015) retrieved Apr. 7, 2015 from http://phys.org/news/2015-03-welding-future-self-learning.html.

Gundersen, O., et al., The Use of an Integrated Multiple Neural Network Structure for Simultaneous Prediction of Weld Shape, Mechanical Properties, and Distortion in 6063-T6 and 6082-T6 Aluminium Assemblies.

Huot, Pierre, The Basics of Weld and Process Monitoring, Apr. 9, 2015, Quality Magazine.

Porter, Nancy C., Session 5, Joining Technologies for Naval Applications, FABTECH International & AWS Welding Show, Nov. 13-16, 2015.

Zaharia, Matei, et al., Resilient Distributed Datasets: A Fault-Tolerant Abstraction for In-Memory Cluster Computing, Electrical Engineering and Computer Sciences, University of California at Berkeley, Technical Report No. UCB/EECS-2011-82, http://www.eecs.berkeley.edu/Pubs/TechRpts/2011/EECS-2011-82.html, Jul. 19, 2011.

Lu, Huang et al: "Research on Hadoop Cloud Computing Model and its Applications", Networking and Distributed Computing (ICNDC), 2012 Third International Conference On, IEEE, Oct. 21, 2012 (Oct.

(56) References Cited

OTHER PUBLICATIONS 21, 2012), pp. 59-63, XP032293322, DOI: 10.1 109/I CN DC.2012. 22 ISBN: 978-1-4673-2858-6.

PCT, Notification of Transmittal of the International Search Report and the Written Opinion of the International Searching Authority, or the Declaration, in Application No. PCT/US2016/051585, dated Dec. 21, 2016 (12 pages).

International Search Report and Written Opinion, mailed Oct. 14, 2016, in International application No. PCT/US2016/044463, filed Jul. 28, 2016.

Bao, Yuan et al: "Massive sensor data management framework in Cloud manufacturing based on Hadoop", Industrial Informatics (INDIN), 2012 10th IEEE International Conference on, IEEE, Jul. 25, 2012 (Jul. 25, 2012), pp. 397-401, XP032235317, DOI: 10.1109/1 NDI N.2012.6301192 ISBN: 978-1-4673-0312-5.

PCT, Notification of Transmittal of the International Search Report and the Written Opinion of the International Searching Authority, or the Declaration, in International application No. PCT/US2016/051579, dated Jan. 10, 2017 (12 pages).

Canadian Office Action Appln No. 2,996, 182 dated Nov. 5, 2019 (5 pgs.).

European Patent Office, Extended Search Report, European Patent Application No. 20161414.6, mailed Aug. 5, 2020, 7 pages.

European Patent Office, Extended Search Report, European Patent Application No. 20176044.4, mailed Dec. 17. 2020, 9 pages.

European Patent Office, Extended European Search Report, European Patent Application No. 20192803.3, mailed Mar. 10, 2021, 7 pages.

Ting Wang, Binliang Jiao, Limeng Ji, "A Wireless Sensor Network Design in Oilfield based on STM32W108", Computer Security, No. 05, May 15, 2011.

Le Zhang, Guangzhi Li, Xin Zeng, "Analysis of Factors Affecting Human Reliability", China Military-Civilian Conversion, No. 03, Mar. 10, 2016.

Shuang Zheng, Mingri Zhu, Yue Wang, "Design of Welding Controlled System Power Source Based on Intensive Interference", Electric Welding Machine, No. 12, Dec. 20, 2008.

\* cited by examiner

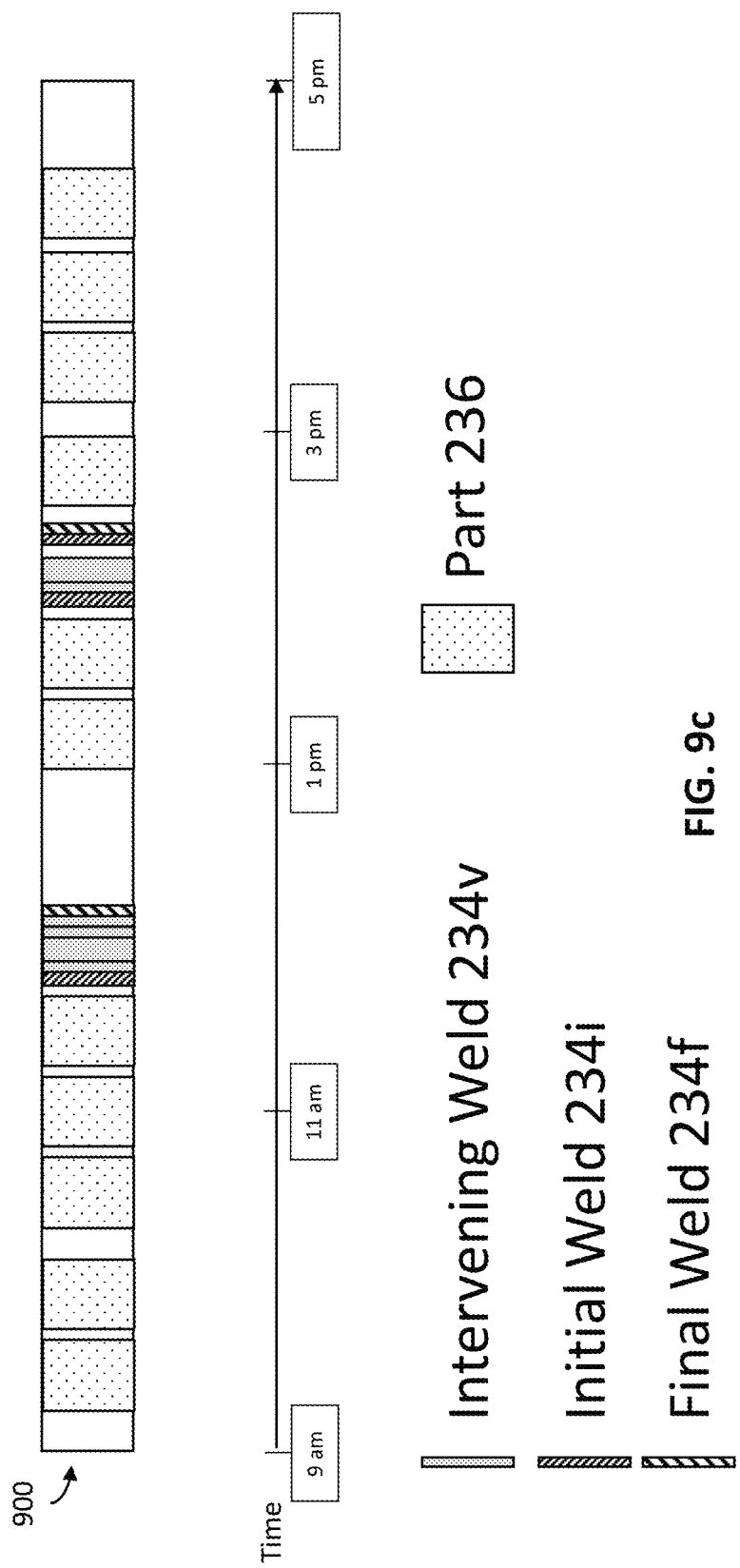

SYSTEMS AND METHODS FOR PART TRACKING USING MACHINE LEARNING TECHNIQUES

CROSS REFERENCE TO RELATED APPLICATIONS

This application claims priority to, and the benefit of, U.S. Provisional Application No. 63/043,854, filed Jun. 25, 2020, entitled "SYSTEMS AND METHODS FOR PART TRACKING USING MACHINE LEARNING TECHNIQUES," the entire contents of which are hereby incorporated by reference.

TECHNICAL FIELD

The present disclosure generally relates to part tracking and, more particularly, to systems and methods for part tracking using machine learning techniques.

BACKGROUND

Welding is sometimes used to assemble one or more parts. Some conventional weld monitoring systems capture and/or monitor data relating to each individual weld. Once monitoring of individual welds is underway, a weld monitoring system may collect data relating to many thousands of individual welds.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to systems and methods for part tracking using machine learning techniques, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

FIGS. 9a-9c illustrate an example analysis of welds in a time period using the example part tracking program of FIGS. 3-8, in accordance with aspects of this disclosure.

Figure 1:
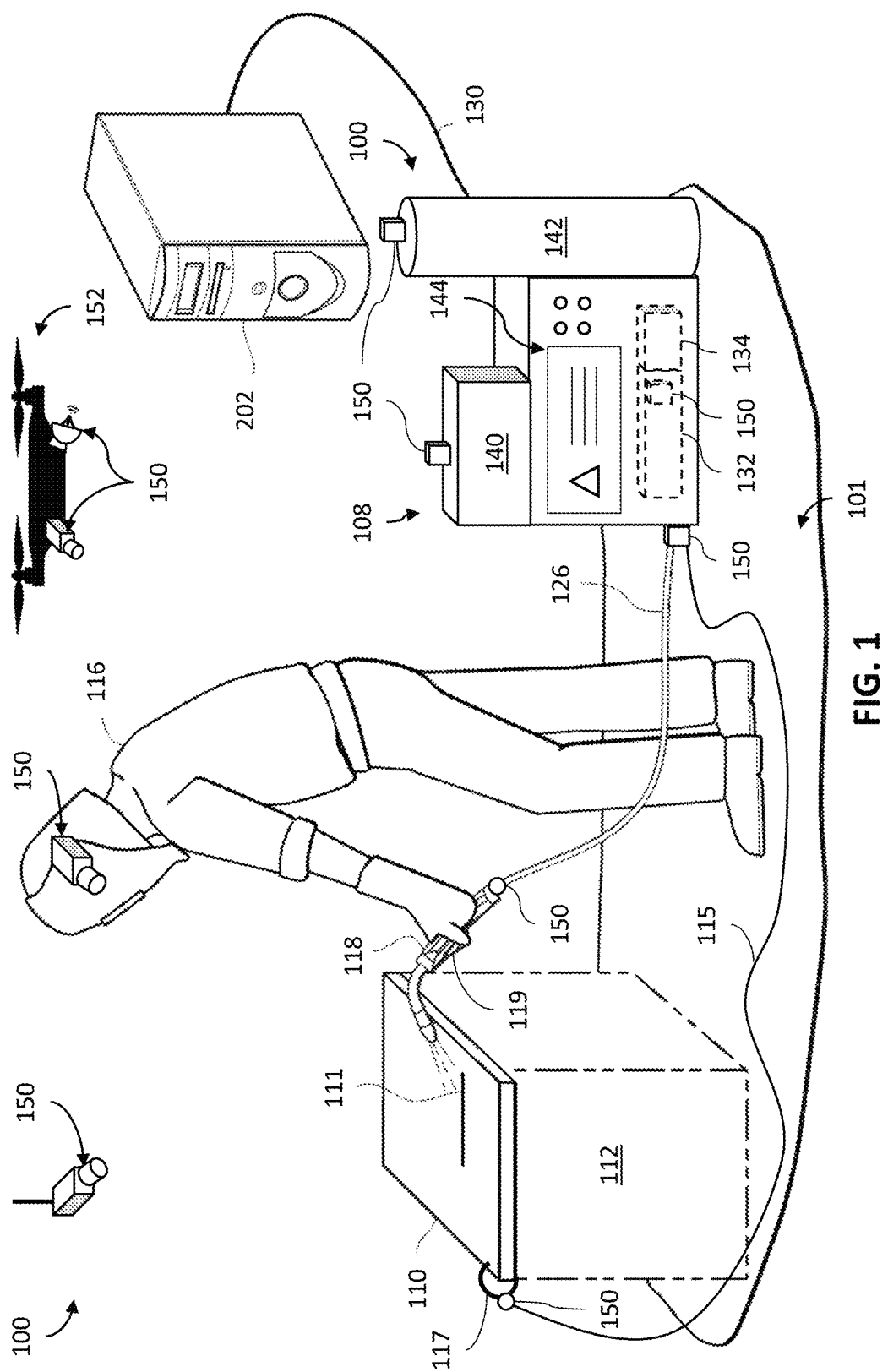
FIG. 1 shows an example of a welding system in communication with a tracking station, in accordance with aspects of this disclosure.

The figures are not necessarily to scale. Where appropriate, the same or similar reference numerals are used in the figures to refer to similar or identical elements. For example, reference numerals utilizing lettering (e.g., welding system 100a, welding system 100b) refer to instances of the same reference numeral that does not have the lettering (e.g., welding system 100).

DETAILED DESCRIPTION

Conventional weld monitoring systems capture and/or monitor data relating to individual welds of welding operations. The result can be a collection of data relating to many thousands of welds, with no indication as to what parts were assembled via the welds. While manual identification of each of the parts assembled by the welds may be theoretically possible, such manual identification would likely be very complicated, cumbersome, and/or time consuming.

Some conventional part tracking systems can identify parts assembled via welds in real time. However, these part tracking systems typically require some manual operator input to tell the system when a part is being started and when a part has been finished. The part tracking systems that do automatically identify and track part assembly in real time require extensive setup by an expert before the system is able to operate effectively. Setting up the system can be a complicated, expensive, and time consuming task, even with an expert. Additionally, even after setup, the system may be strictly future looking—able to track parts that are created after setup, but unable to identify parts created via prior welds.

Some examples of the present disclosure relate to systems that analyze data related to one or more welds to identify one or more parts repeatedly assembled by the welds, and/or determine characteristics of one or more parts repeatedly assembled by the welds. In some examples, the disclosed systems may use machine learning techniques to identify the types of parts assembled, and/or determine the characteristics of the parts. Identifying the parts assembled from the welds may make it possible to do part based analytics (e.g., related to part quality, cost, production efficiency, etc.), as opposed to just weld based analytics. Additionally, identifying a part assembled from several welds results in an ordering of those several welds used to create the part, which can make it easier to compare/contrast similar welds across parts. Further, determining the characteristics of the parts can assist in configuring the necessary settings of certain part tracking systems, thereby reducing the expertise, time, and personnel required to accurately configure automatic part tracking systems.

Some examples of the present disclosure relate to a system, comprising processing circuitry; and memory circuitry comprising computer readable instructions which, when executed, cause the processing circuitry to identify a plurality of welds that occur during a time period based on captured data pertaining to a welding related operation taking place during the time period, and analyze one or more feature characteristics of the plurality of welds determined based on the sensor data using one or more machine learning techniques to determine a type of part assembled via first consecutive welds of the plurality of welds.

In some examples, the one or more machine learning techniques include a distance metric, a statistical analysis, or a neural net technique. In some examples, the memory circuitry comprises computer readable instructions which, when executed, further cause the processing circuitry to construct a model of the type of part using at least some first characteristics of the one or more feature characteristics, wherein the first consecutive welds are associated with the first characteristics, and apply the model to second characteristics of the one or more feature characteristics to identify second consecutive welds that match the model. In some examples, the model comprises a neural network representation of the type of part, a data set comprising measured data relating to assembly of the type of part, or a statistical representation of the type of part.

In some examples, the memory circuitry comprises computer readable instructions which, when executed, further cause the processing circuitry to determine whether the second consecutive welds match the model based on a comparison of the second characteristics with one or more model characteristics of the model, and in response to determining the second consecutive welds do match the model, associate the second consecutive welds with the type of part. In some examples, the memory circuitry comprises computer readable instructions which, when executed, further cause the processing circuitry to analyze a quality of a part assembled by the one or more other consecutive welds via a comparison of the second characteristics with ideal feature characteristics. In some examples, the ideal feature characteristics comprise one or more statistical averages or standard deviations, or the ideal feature characteristics are determined based on the model.

In some examples, the memory circuitry comprises computer readable instructions which, when executed, further cause the processing circuitry to analyze a production metric or cost metric of a part assembled by the one or more other consecutive welds. In some examples, the memory circuitry comprises computer readable instructions which, when executed, further cause the processing circuitry to predict a next part assembled via one or more new welds will be a part type the same as the type of part assembled by the second consecutive welds, output, via a user interface, directions that guide an operator through assembly of the part type, determine whether one or more new feature characteristics of the one or more new welds are within one or more threshold deviations of one or more expected feature characteristics for the part type, and in response to determining the one or more new feature characteristics are not within one or more threshold deviations of the one or more expected featured characteristics, output a notification. In some examples, the model comprises a first model, and wherein the memory circuitry comprises computer readable instructions which, when executed, further cause the processing circuitry to determine whether the one or more second consecutive welds match the first model based on a comparison of the second characteristics with one or more first model characteristics of the first model, and in response to determining the one or more second consecutive welds do not match the first model, determine whether the one or more second consecutive welds match a second model based on a comparison of the second characteristics with one or more second model characteristics of the second model.

Some examples of the present disclosure relate to a method, comprising identifying, via processing circuitry, a plurality of welds that occur during a time period based on captured data pertaining to a welding related operation taking place during the time period, and analyzing one or more feature characteristics of the plurality of welds using one or more machine learning techniques to determine a type of part assembled via first consecutive welds of the plurality of welds.

In some examples, the one or more machine learning techniques include a distance metric, a statistical analysis, or a neural net technique. In some examples, the method further comprises constructing a model of the type of part using at least some first characteristics of the one or more feature characteristics, wherein the first consecutive welds are associated with the first characteristics; and applying the model to second characteristics of the one or more feature characteristics to identify second consecutive welds that match the model. In some examples, the model comprises a neural network representation of the type of part, a data set comprising measured data relating to assembly of the type of part, or a statistical representation of the type of part.

In some examples, the method further comprises determining whether the second consecutive welds match the model based on a comparison of the second characteristics with one or more model characteristics of the model; and in response to determining the second consecutive welds do match the model, associate the second consecutive welds with the type of part. In some examples, the method further comprises analyzing a quality of a part assembled by the one or more other consecutive welds via a comparison of the second characteristics with ideal feature characteristics. In some examples, the ideal feature characteristics comprise one or more statistical averages or standard deviations, or the ideal feature characteristics are determined based on the model.

In some examples, the method further comprises analyzing a production metric or cost metric of a part assembled by the one or more other consecutive welds. In some examples, the method further comprises predicting a next part assembled via one or more new welds will be a part type the same as the type of part assembled by the second consecutive welds; outputting, via a user interface, directions that guide an operator through assembly of the part type; determining whether one or more new feature characteristics of the one or more new welds are within one or more threshold deviations of one or more expected feature characteristics for the part type; and in response to determining the one or more new feature characteristics are not within one or more threshold deviations of the one or more expected featured characteristics, output a notification. In some examples, the method further comprises determining whether the one or more second consecutive welds match the first model based on a comparison of the second characteristics with one or more first model characteristics of the first model, and in response to determining the one or more second consecutive welds do not match the first model, determine whether the one or more second consecutive welds match a second model based on a comparison of the second characteristics with one or more second model characteristics of the second model.

FIG. 1 shows an example welding system 100 in communication with a tracking station 202. As shown, the welding system 100 includes a welding torch 118 and work clamp 117 coupled to a welding-type power supply 108 within a welding cell 101. As shown, the tracking station 202 is electrically coupled to (and/or in electrical communication with) the welding-type power supply 108. In some examples, the tracking station 202 may also be in communication with the welding torch 118 (e.g., via the welding-type power supply 108).

In the example of FIG. 1, an operator 116 is handling the welding torch 118 near a welding bench 112 within the welding cell 101. In some examples, the welding bench 112 may be and/or include a fixturing system configured to hold one or more workpiece(s) 110. In some examples the fixturing system may include one or more work clamps 117 (e.g., manual and/or pneumatic clamps). In some examples, the workpiece(s) 110 may be independent of a welding bench 112, such as, for example a freestanding element such as a structural steel element, pipeline, or bridge. While a human operator 116 is shown in FIG. 1, in some examples, the operator 116 may be (and/or control) a robot and/or automated welding machine.

In the example of FIG. 1, the welding torch 118 is coupled to the welding-type power supply 108 via a welding cable 126. The clamp 117 is also coupled to the welding-type power supply 108 via a clamp cable 115. The welding-type power supply 108 is, in turn, in communication with tracking station 202, such as via conduit 130. In some examples, the welding-type power supply 108 may alternatively, or additionally, include wireless communication capabilities (e.g., wireless communication circuitry), through which wireless communication may be established with tracking station 202. While shown as being in direct communication with tracking station 202, in some examples, the welding-type power supply 108 may be in communication with tracking station 202 through a network (e.g., the Internet, a wide access network, local access network, etc.).

In the example of FIG. 1, the welding torch 118 is a gun configured for gas metal arc welding (GMAW). In some examples, the welding torch 118 may comprise an electrode holder (i.e., stinger) configured for shielded metal arc welding (SMAW). In some examples, the welding torch 118 may comprise a torch and/or filler rod configured for gas tungsten arc welding (GTAW). In some examples, the welding torch 118 may comprise a gun configured for flux-cored arc welding (FCAW). In some examples, the welding torch 118 may additionally, or alternatively, comprise a filler rod. In the example of FIG. 1, the welding torch 118 includes a trigger 119. In some examples, the trigger 119 may be actuated by the operator 116 to activate a welding-type operation (e.g., arc).

In the example of FIG. 1, the welding-type power supply 108 includes (and/or is coupled to) a wire feeder 140. In some examples, the wire feeder 140 houses a wire spool that is used to provide the welding torch 118 with a wire electrode (e.g., solid wire, cored wire, coated wire). In some examples, the wire feeder 140 further includes motorized rollers configured to feed the wire electrode to the torch 118 (e.g., from the spool) and/or retract the wire electrode from the torch 118 (e.g., back to the spool).

In the example of FIG. 1, the welding-type power supply 108 also includes (and/or is coupled to) a gas supply 142. In some examples, the gas supply 142 supplies a shielding gas and/or shielding gas mixtures to the welding torch 118 (e.g., via cable 126). A shielding gas, as used herein, may refer to any gas (e.g., $CO_2$, argon) or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth).

In the example of FIGS. 1 and 2, the welding-type power supply 108 also includes an operator interface 144. In the example of FIG. 1, the operator interface 144 comprises one or more adjustable inputs (e.g., knobs, buttons, switches, keys, etc.) and/or outputs (e.g., display screens, lights, speakers, etc.) on the welding-type power supply 108. In some examples, the operator interface 144 may comprise a remote control and/or pendant. In some examples, the operator 116 (and/or other user) may use the operator interface 144 to enter and/or select one or more weld parameters (e.g., voltage, current, gas type, wire feed speed, workpiece material type, filler type, etc.) and/or weld operations for the welding-type power supply 108. In some examples, the operator interface 144 may further include one or more receptacles configured for connection to (and/or reception of) one or more external memory devices (e.g., floppy disks, compact discs, digital video disc, flash drive, etc.).

In the example of FIG. 1, the welding-type power supply 108 includes power conversion circuitry 132 configured to receive input power (e.g., from mains power, a generator, etc.) and convert the input power to welding-type output power. In some examples, the power conversion circuitry 132 may include circuit elements (e.g., transformers, rectifiers, capacitors, inductors, diodes, transistors, switches, and so forth) capable of converting the input power to output power. In some examples, the power conversion circuitry 132 may also include one or more controllable circuit elements. In some examples, the controllable circuit elements may comprise circuitry configured to change states (e.g., fire, turn on/off, close/open, etc.) based on one or more control signals. In some examples, the state(s) of the controllable circuit elements may impact the operation of the power conversion circuitry 132, and/or impact characteristics (e.g., current/voltage magnitude, frequency, waveform, etc.) of the output power provided by the power conversion circuitry 132. In some examples, the controllable circuit elements may comprise, for example, switches, relays, transistors, etc. In examples where the controllable circuit elements comprise transistors, the transistors may comprise any suitable transistors, such as, for example MOSFETs, JFETs, IGBTs, BJTs, etc.

In the example of FIG. 1, the welding-type power supply 108 further includes control circuitry 134 electrically coupled to and configured to control the power conversion circuitry 132. In some examples, the control circuitry 134 may include processing circuitry (and/or one or more processors) as well as analog and/or digital memory. In some examples, the control circuitry 134 is configured to control the power conversion circuitry 132, to ensure the power conversion circuitry 132 generates the appropriate welding-type output power for carrying out the desired welding-type operation.

In some examples, the control circuitry 134 is also electrically coupled to and/or configured to control the wire feeder 140 and/or gas supply 142. In some examples, the control circuitry 134 may control the wire feeder 140 to output wire at a target speed and/or direction. For example, the control circuitry 134 may control the motor of the wire feeder 140 to feed wire to (and/or retract the wire from) the torch 118 at a target speed. In some examples, the welding-type power supply 108 may control the gas supply 142 to output a target type and/or amount gas. For example, the control circuitry 134 may control a valve in communication with the gas supply 142 to regulate the gas delivered to the welding torch 118.

In the example of FIG. 1, the welding system 100 further includes several sensors 150. In some examples, one or more of the sensors 150 may comprise one or more of a current sensor, a voltage sensor, a magnetic field sensor, a resistance sensor, a wire feed speed sensor, a gas flow sensor, a clamping sensor, an NFC interrogator, an RFID interrogator, a Bluetooth interrogator, a barcode reader, a camera, an optical sensor, an infrared sensor, an acoustic sensor, a sound sensor, a microphone, a position sensor, a global positioning system (GPS) unit, an accelerometer, an inertial measurement unit, an x-ray sensor, a radiographic sensor, a torque sensor, a non-destructive testing sensor, a temperature sensor, and/or a humidity sensor. As shown, the sensors 150 are positioned in, on, and/or proximate to the work clamp 117, welding torch 118, welding-type power supply 108, wire feeder 140, gas supply 142, and power conversion circuitry 132.

In the example of FIG. 1, a sensor 150 is also shown mounted to and/or hanging from a fixture (e.g., wall, door, ceiling, pillar, curtain, etc.) of the welding cell 101. While only one sensor 150 is shown mounted to and/or hanging from a fixture, in some examples, multiple sensors 150 may be mounted to and/or hung from a fixture. As shown, multiple sensors 150 are also mounted to and/or hanging from an unattended robot vehicle 152 (e.g., a drone). While the robot vehicle 152 is an aerial vehicle in the example of FIG. 1, in some examples, the robot vehicle 152 may instead be a ground vehicle or an aquatic vehicle.

In some examples, the sensors 150 may be configured to sense, detect, and/or measure various data of the welding system 100. For example, the sensors 150 may sense, detect, and/or measure data such as one or more locations, positions, and/or movements of the operator 116, welding torch 118, workpiece 110, and/or other objects within the welding cell 101. As another example, the sensors 150 may sense, detect, and/or measure data such as air temperature, air quality, electromagnetism, and/or noise in the welding cell 101. As another example, the sensors 150 may sense, detect, and/or measure data such as a voltage and/or current of the power received by the welding-type power supply 108, power conversion circuitry 132, and/or welding torch 118, and/or the voltage and/or current of the power output by the welding-type power supply 108 and/or power conversion circuitry 132. As another example, the sensors 150 may sense, detect, and/or measure data such as a velocity (e.g., speed and/or feed direction) of the wire feeder 140 and/or type of wire being fed by the wire feeder 140. As another example, the sensors 150 may sense, detect, and/or measure data such as a gas type and/or gas flow (e.g., through a valve) from the gas supply 142 to the welding torch 118. As another example, the sensors 150 may sense, detect, and/or measure data such as a trigger signal (e.g., actuation, de-actuation, etc.) of the welding torch 118, and/or a clamping signal (e.g., clamp, unclamp, etc.) of the clamp 117.

In some examples, the sensors 150 may be configured to communicate data sensed, detected, and/or measured to the welding-type power supply 108 and/or tracking station 202. In some examples, the control circuitry 134 may be in communication with some or all of the sensors 150 and/or otherwise configured to receive information from the sensors 150. In some examples, the tracking station 202 may be in communication with some or all of the sensors 150 and/or otherwise configured to receive information from the sensors 150 (e.g., through the control circuitry 134).

In some examples, a welding operation (and/or welding process) may be initiated when the operator 116 actuates the trigger 119 of the welding torch 118 (and/or otherwise activates the welding torch 118). During the welding operation, the welding-type power provided by the welding-type power supply 108 may be applied to the electrode (e.g., wire electrode) of the welding torch 118 in order to produce a welding arc between the electrode and the one or more workpieces 110. The heat of the arc may melt portions of a filler material (e.g., wire) and/or workpiece 110, thereby creating a molten weld pool. Movement of the welding torch 118 (e.g., by the operator) may move the weld pool, creating one or more welds 111.

When the welding operation is finished, the operator 116 may release the trigger 119 (and/or otherwise deactivate/de-actuate the welding torch 118). In some examples, the control circuitry 134 may detect that the welding operation has finished. For example, the control circuitry 134 may detect a trigger release signal via sensor 150. As another example, the control circuitry 134 may receive a torch deactivation command via the operator interface 144 (e.g., where the torch 118 is maneuvered by a robot and/or automated welding machine).

In some examples, the sensors 150 may detect certain data pertaining to the welding-type power supply 108, clamp 117, bench 112, and/or welding torch 118 during a welding process. In some examples, the welding-type power supply 108 may also detect certain data (e.g., entered via the operator interface 144, detected by control circuitry 134, etc.) In some examples, the sensors 150 and/or welding-type power supply 108 may be configured to communicate this data to the tracking station 202 (directly and/or through welding-type power supply 108). In some examples, the data may be communicated to the tracking station 202 in real time, periodically during a welding operation, and/or after a welding operation. In some examples, the tracking station 202 may be embodied and/or implemented within the welding-type power supply 108 (e.g., via control circuitry 134)

The data collected by the sensors 150, power supply 108, and/or other portions of the welding system 100 can be valuable. For example, the data may be analyzed to automatically identify individual welds, as well as determine quality, cost, and/or production metrics of the individual welds. However, the data would be even more valuable if the part(s), and/or type(s) of part(s), produced by the individual welds could be automatically identified as well.

Figure 2A:
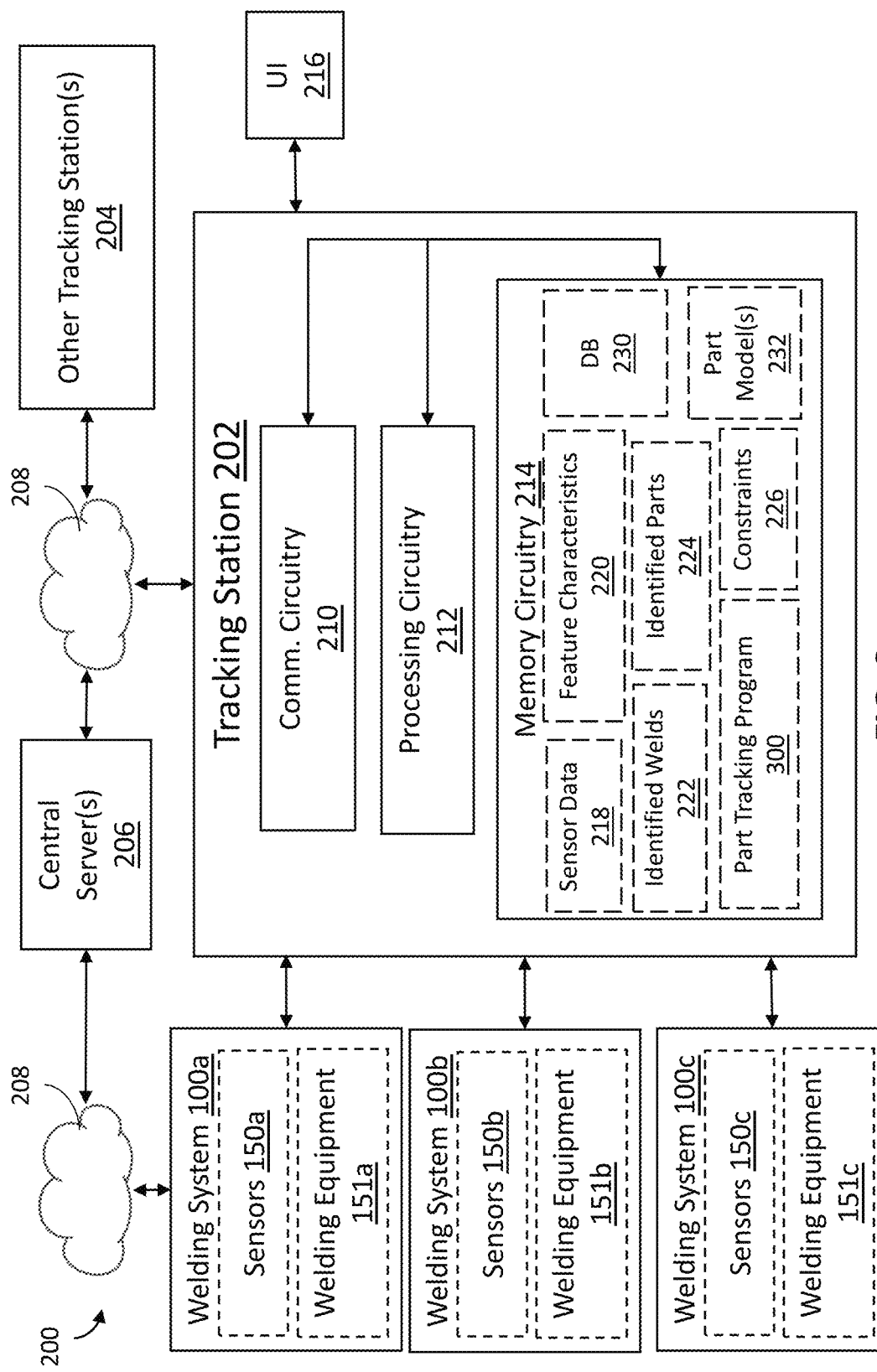
FIG. 2a is a block diagram showing an example of a part tracking system, including several of the welding systems of FIG. 1, in accordance with aspects of this disclosure.

FIG. 2a is a block diagram showing an example part tracking system 200. As shown, the part tracking system 200 includes the part tracking station 202, as well as several welding systems 100 (each having sensors 150 and welding equipment 151) in communication with the part tracking station 202. In the example of FIG. 2a, the part tracking system 200 further includes one or more central servers 206, and one or more other tracking stations 204.

In the example of FIG. 2a, the tracking station 202 is electrically (and/or communicatively) coupled to the sensors 150 and/or welding equipment 151 (e.g. power supplies 108, torches 118, clamps 117, etc.) of each welding system 100. While three welding systems 100 are shown in the example of FIG. 2a, in some examples, there may be more or less welding systems 100. In some examples, the tracking station 202 (and/or central server(s) 206) may receive data from the system(s) 100 continuously, periodically, and/or on demand.

In the example of FIG. 2a, the tracking station 202 is electrically (and/or communicatively) coupled to a user interface (UI) 216. In some examples, the UI 216 may comprise one or more input devices (e.g., touch screens, mice, keyboards, buttons, knobs, microphones, dials, etc.) and/or output devices (e.g., display screens, speakers, lights, etc.). In some examples, the UI 216 may further include one or more receptacles configured for connection to (and/or reception of) one or more external memory devices (e.g., floppy disks, compact discs, digital video disc, flash drive, etc.). In operation, an operator 116 or other user may provide input to, and/or receive output from, the tracking station 202 via the UI 216. While shown as a separate component in the example of FIG. 2a, in some examples, the UI 216 may be part of the tracking station 202.

In the example of FIG. 2a, the tracking station 202 is in communication with one or more other tracking stations 204 and one or more central servers 206 through network 208 (e.g., the Internet, a wide access network, local access network, etc. As shown, the sensors 150a and welding equipment 151a of welding system 100a are also in communication with the central server(s) 206 through a network 208. While only one welding system 100a is shown as being communicatively coupled to the central server(s) 206 through the network 208, in some examples, all, some, or none of the welding systems 100 may be communicatively coupled to the central server(s) 206 through the network 208. In some examples, the tracking station 202 may be in communication with the one or more other tracking stations 204 and/or the one or more central servers 206 directly, rather than through the network 208. In some examples, the welding system 100a may be in communication with the central server(s) 206 directly, rather than through the network 208. In some examples, the central server(s) 206 may be implemented via the tracking station 202 and/or one or more of the other tracking stations 204. In some examples, one or more of the other tracking station(s) 204 may be tracking stations 200 that are remotely located.

In the example of FIG. 2a, the tracking station 202 includes communication circuitry 210, processing circuitry 212, and memory circuitry 214, interconnected with one another via a common electrical bus. In some examples, the processing circuitry 212 may comprise one or more processors. In some examples, the communication circuitry 210 may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry 210 may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.). In some examples, the tracking station 202 may be implemented by way of a desktop computer, laptop computer, computer server, and/or welding-type power supply 108 (e.g., via control circuitry 134).

In the example of FIG. 2a, the memory circuitry 214 stores sensor data 218 received from sensors 150, feature characteristics 220 extracted from the sensor data 218, identified welds 222 (e.g., identified from the feature characteristics 220), and identified parts 224 (e.g., identified from the identified welds 222). As shown, the memory circuitry 214 additionally stores a part tracking program 300, as well as certain known constraints 226 and one or more existing part model(s) 228 (e.g., developed and/or used by the part tracking program 300). The memory circuitry 214 further stores a database (DB) 230 (e.g., used to organize and/or store the sensor data 218, feature characteristics 220, identified welds 222, identified parts 224, part models 232, and/or known constraints 226).

While shown as stored in memory circuitry 214 in the example of FIG. 2a, in some examples, the sensor data 218, feature characteristics 220, identified welds 222, identified parts 224, part models 232, and/or known constraints 226 may alternatively, or additionally, be stored in the DB 230, in memory circuitry of the central server(s) 206, and/or in memory circuitry of other tracking station(s) 204. While shown as stored in memory circuitry 214 of the tracking station 202 in the example of FIG. 2a, in some examples, all or some of the part tracking program 300 may be stored in memory circuitry of the central server(s) 206, and/or executed by processing circuitry of the central server(s) 206. While shown as stored in the memory circuitry 214 of the tracking station 202 in FIG. 2a, in some examples, the DB 230 may alternatively, or additionally be stored in memory circuitry of the central server(s) 206 and/or other tracking station(s) 204. For the sake of convenience, future references to memory circuitry 214 of the tracking station 202, memory circuitry of the central server(s) 206, and/or memory circuitry 214 of other tracking stations 204 may be referred to collectively as memory.

Figure 2B:
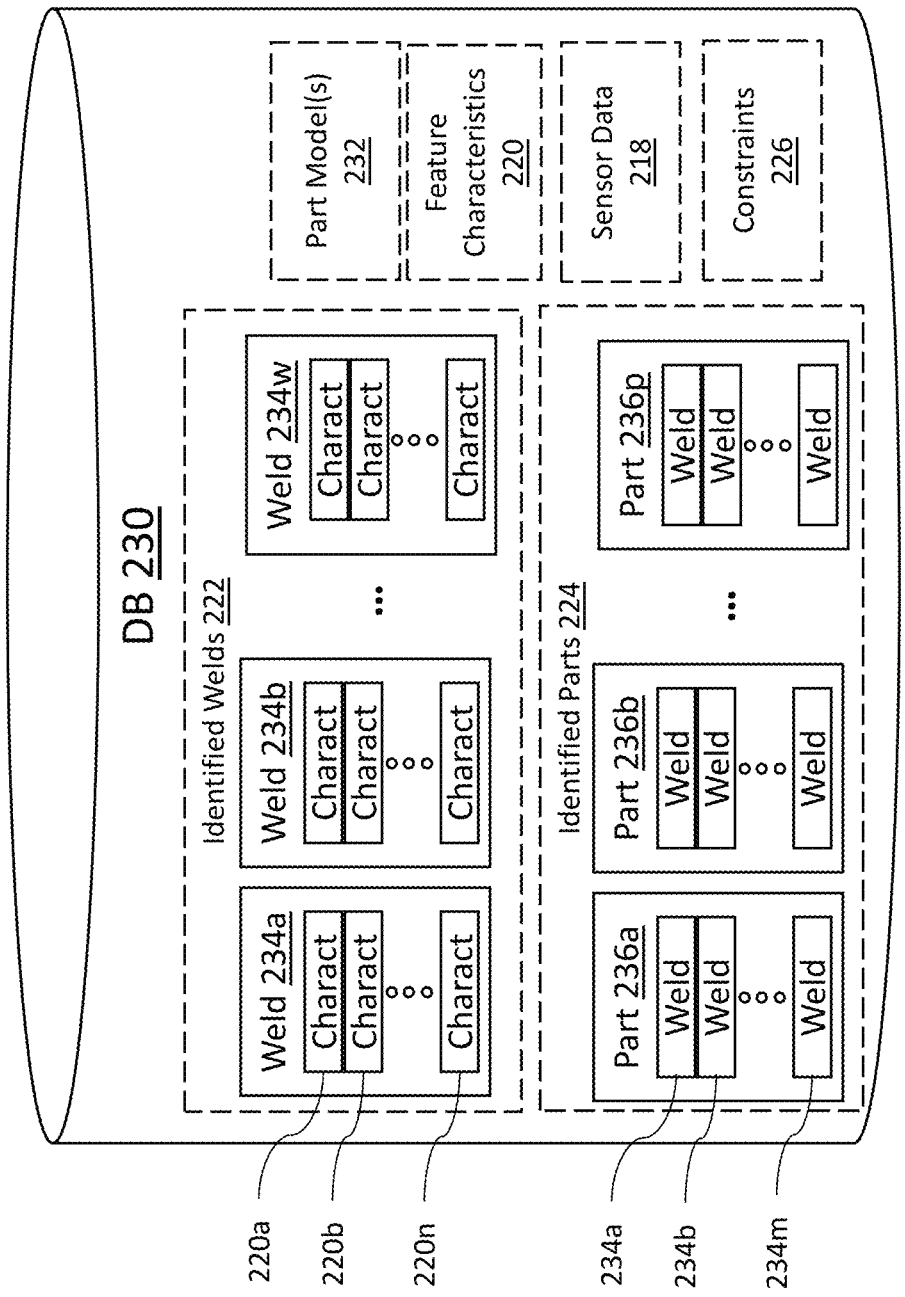
FIG. 2b is a block diagram showing an example database of the part tracking system of FIG. 2a, in accordance with aspects of this disclosure.

FIG. 2b is a block diagram showing more detail of an example DB 230 storing sensor data 218, feature characteristics 220, identified welds 222, identified parts 224, part models 232, and/or known constraints 226. As shown, the identified welds 222 stored in the DB 230 comprise a plurality of welds 234. Each weld 234 of the identified welds 222 comprises a plurality of feature characteristics 220. Feature characteristics of a weld 234 may include, for example, duration of a weld 234, start date/time, end date/time, operator (e.g., name, ID), voltage, current, and/or other relevant feature characteristics 220 discussed herein. In the example of FIG. 2b, the identified parts 224 stored in the DB 230 comprise a plurality of parts 236. As shown, each part 236 of the identified parts 224 includes a plurality of welds 234. In some examples, a part 236 may also include part specific feature characteristics 220.

In some examples, the part tracking program 300 may analyze data collected by the sensors 150, operator interface 144, and/or welding equipment 151 of each welding system 100, as well as data collected via the UI 216 (collectively referred to hereinafter as sensor data 218). In some examples, the sensor data 218 may be used to identify time periods of welding activity (e.g., via signal(s) representative of a trigger pull/release, voltage/current detection, etc.). In some examples, these time periods of welding activity may be identified as welds 234 (e.g., of the identified welds 222). In some examples, the part tracking program 300 may determine certain feature characteristics 220 based on the analysis of the sensor data 218, and associate relevant feature characteristics 220 with each weld 234 of the identified welds 222.

In some examples, the part tracking program 300 may identify the parts 236 (and/or type(s) of parts 236) created and/or assembled via identified welds 222 using one or more machine learning techniques. For example, the part tracking program 300 may create one or more part models 232 using machine learning techniques (and/or access one or more existing part models 232). In some examples, the part tracking program 300 may create (and/or use) a different part model 232 for each different type of part 236 identified by the part tracking program 300 and/or assembled by the welding system 100. In some examples, the part tracking program 300 may use the part models 232 to identify parts 236 (and/or types of parts 236) created and/or assembled via one or more welds 234 of the identified welds 222.

FIGS. 3-8 are flowcharts illustrating an example part tracking program 300. In some examples, the part tracking program 300 may be implemented in machine readable (and/or processor executable) instructions stored in memory and/or executed by processing circuitry.

Figure 3:
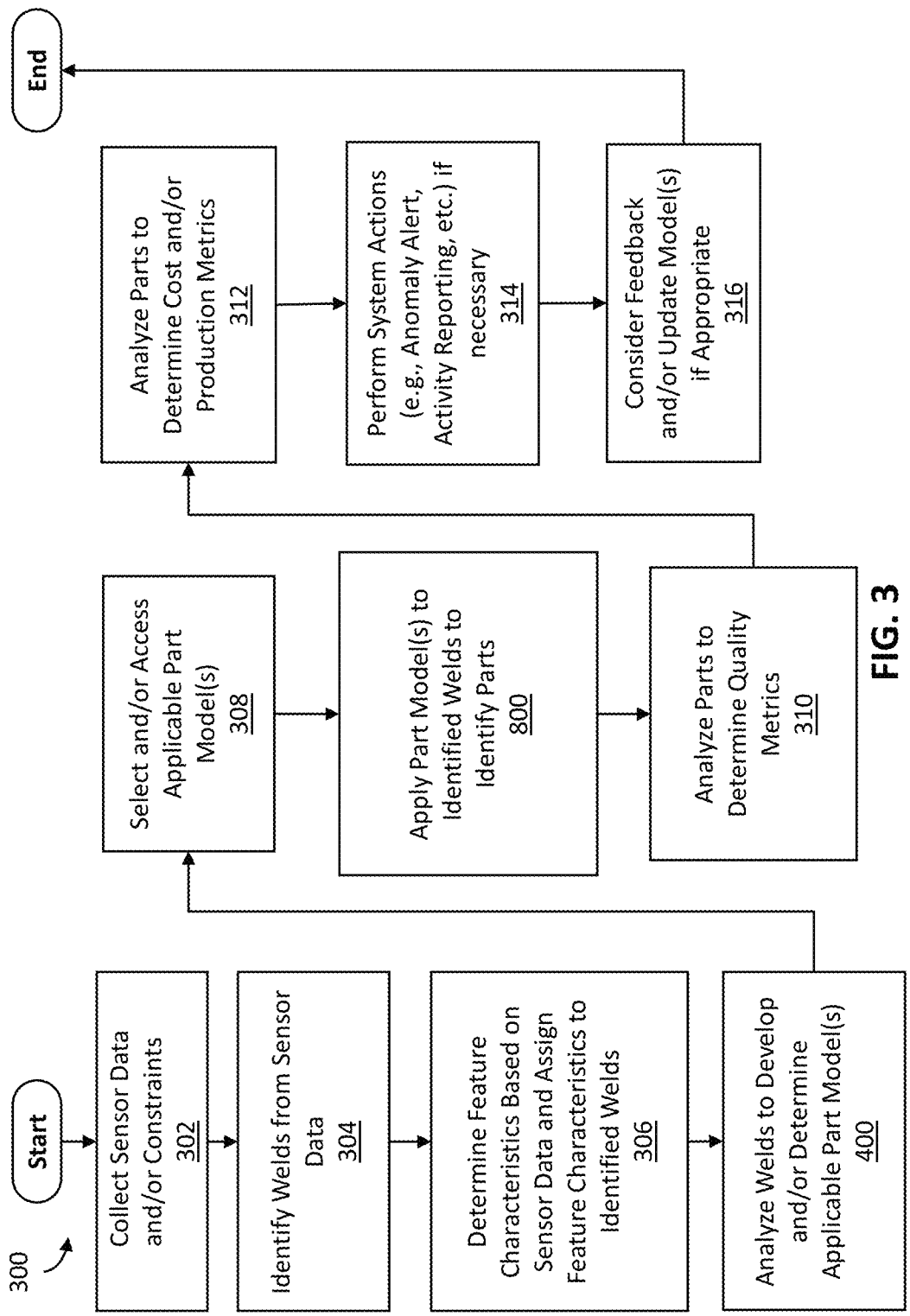
FIGS. 3-8 are flow diagrams illustrating an example part tracking program, in accordance with aspects of this disclosure.

In the example of FIG. 3, the part tracking program 300 begins at block 302. At block 302, the part tracking program 300 collects sensor data 218 from sensors 150 and/or welding equipment 151 in a welding system 100 (and/or multiple welding systems 100). In some examples, data may also be collected from UI 216. While the data collected at block 302 may come from more than just sensors 150, the data may be collectively referred to as sensor data 218 for convenience.

As shown, the part tracking program 300 also collects known constraints 226 (e.g., from UI 216) at block 302. In some examples, the known constraints 226 may comprise information that may assist the part tracking program 300 in constructing and/or selecting part model(s) 232. In some examples, known constraints 226 may include such information as, for example, probable (and/or actual): number(s) of welds 234 in a part 236 (and/or type of part 236), parts 236 (and/or type(s) of parts 236) produced by particular operator(s) 116, parts 236 (and/or type(s) of parts 236) produced during particular shift(s), parts 236 (and/or type(s) of parts 236) produced during particular time frames, parts 236 (and/or type(s) of parts 236) produced using particular fixture(s), and/or other pertinent information. In some examples, known constraints 226 may include such information as, for example, a preference for (or against) models 232 trained on welds 234 of one or more particular operators 116, shifts, time periods, fixtures, parts 236, etc.

In some examples, the sensor data 218 and/or constraints 226 may be stored in the DB 230 and/or memory. While shown in the example of FIG. 3 for the sake of understanding, in some examples, the collection of sensor data 218 and/or constraints 226 may happen outside of the context of the part tracking program 300. While shown as taking place at the beginning of the part tracking program 300 in the example of FIG. 3 for the sake of understanding, in some examples, the collection of sensor data 218 and/or constraints 226 may happen at other times. In some examples, additional data may also be collected at block 302 (e.g., event data).

In the example of FIG. 3, the part tracking program 300 proceeds to block 304 after block 302. At block 304, the part tracking program 300 identifies one or more individual welds 234 based on the collected sensor data 218. In some examples, this identification may comprise identifying a start and/or an end of one or more past and/or present (e.g., currently occurring in real-time) welds 234. For example, the part tracking program 300 may analyze sensor data 218 representative of a trigger 119 pull/release, wire feed speed increase/decrease from/to zero, gas flow increase/decrease from/to zero, etc. at a certain time, and determine based on the sensor data 218 that a weld 234 began or ended at that time. Once a start and end of a weld 234 is identified, the part tracking program 300 may save the weld 234 in memory (and/or the DB 230) as part of the identified welds 222.

While shown in the example of FIG. 3 for the sake of understanding, in some examples, the identification of welds 234 may happen outside of the context of the part tracking program 300. While shown as taking place after block 302 in the example of FIG. 3 for the sake of understanding, in some examples, the block 304 may happen at other times.

In the example of FIG. 3, the part tracking program 300 proceeds to block 306 after block 304. At block 306, the part tracking program 300 analyzes the sensor data 218 collected at block 302 to determine one or more feature characteristics 220 of one or more welds 234 of the identified welds 222. For example, the part tracking program 300 may determine a weld start time of the weld 234 and a weld end time of the weld 234 based on timestamp information and the start and end of the weld 234 identified at block 304. As another example, the part tracking program 300 may determine a weld duration of the weld 234 based on the difference between the weld start time and weld end time. As another example, the part tracking program 300 may determine an average (and/or time series values of) voltage, current, wire feed speed, gas flow rate, work angle, torch travel speed, torch travel angle, weld temperature, ambient humidity, and/or ambient temperature over the duration of the weld 234 (e.g., based on sensor data 218). As another example, the part tracking program 300 may determine the relevant operator 116, gas type, wire type, workpiece material type, and/or location of the weld 234 (e.g., based on sensor data 218). In some examples, the part tracking program 300 may save these feature characteristics 220 as part of the weld 234, and/or otherwise associate the feature characteristics 220 with the weld 234.

In some examples, feature characteristics 220 of a weld 234 may comprise one or more of a weld start time, a weld end time, a weld duration, a weld type, a weld identifier, a weld class, a weld procedure, a voltage, a current, a wire feed speed, a gas flow, a torch travel speed, a torch travel angle, a work angle, weld coordinates, a weld temperature, a weld property measurement, weld inspection data, a shift start time, a shift end time, an operator identifier, an operator name, an operator qualification, workpiece material preparation information, a workpiece material type, a wire type, a filler material property, a gas type, an assembly location, an ambient temperature, an ambient humidity, a false weld/arc flag (e.g., if weld duration is below a threshold), an ignore weld flag (e.g., if some input provided directing system to ignore), a total deposited wire/filler amount, a total gas amount used, a weld pass number, a weld confidence metric, a weld quality metric, a previous event type (e.g., weld, operator login, equipment fault, tip change, shift start/end, break start/end, etc.), a time since last weld, a time until next weld, a previous workflow event (e.g., perform maintenance), a job type, an image of an operational environment, and/or an image of the welding-related operation. In some examples, feature characteristics may 220 also be determined for and/or associated with each part 236, in addition to the feature characteristics 220 of the welds 234 of the part 236. In some examples, feature characteristics 220 specific to a part 236 may include one or more of a part assembly start time, a part assembly end time, a part assembly duration, a number of expected welds, a number of completed welds, a number of false arcs, a number of ignored welds, a number of extra welds, a number of missing welds, a clamp time, a cycle time, a total deposited wire/filler amount, a total arc time, a total gas amount used, a part property measurement, part inspection data, a shift start time, a shift end time, an operator identifier, an operator name, an operator qualification, and/or a job type. In some examples, the part tracking program 300 may store the feature characteristics in the DB 230.

Figure 9A:
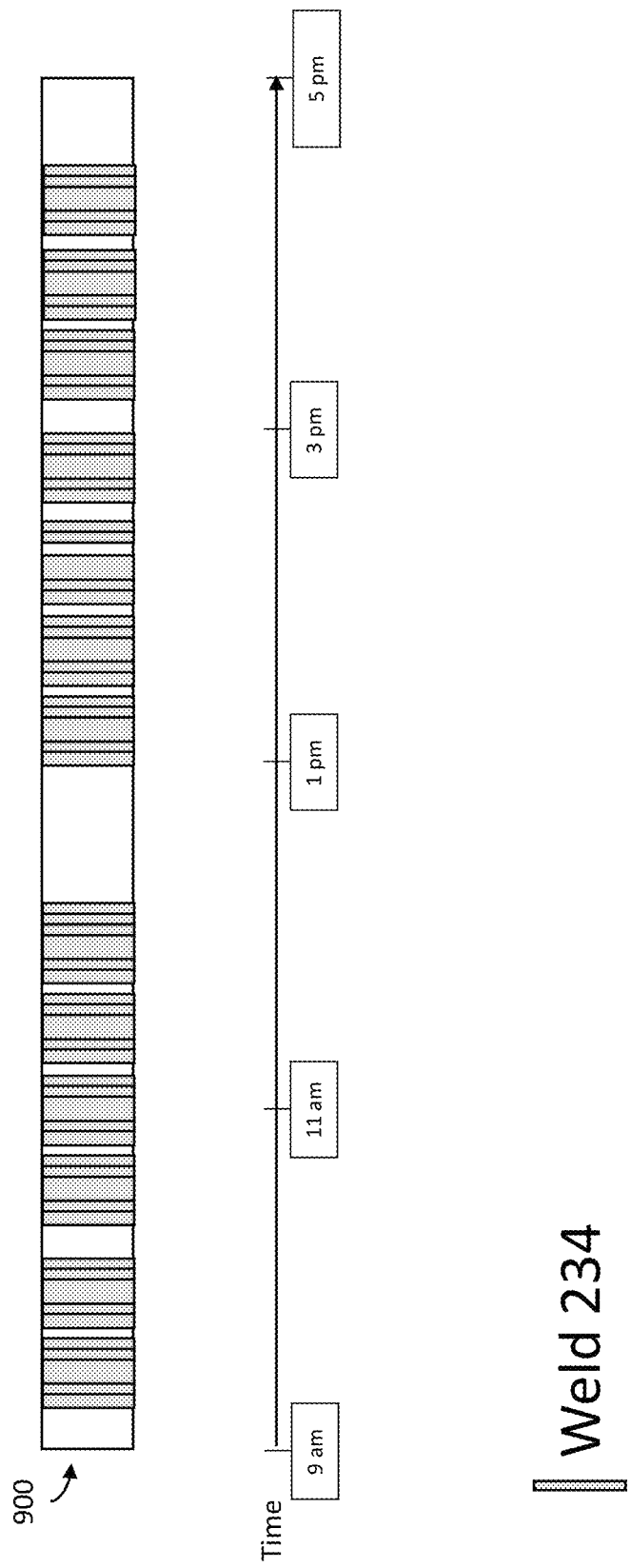
Figure 9B:
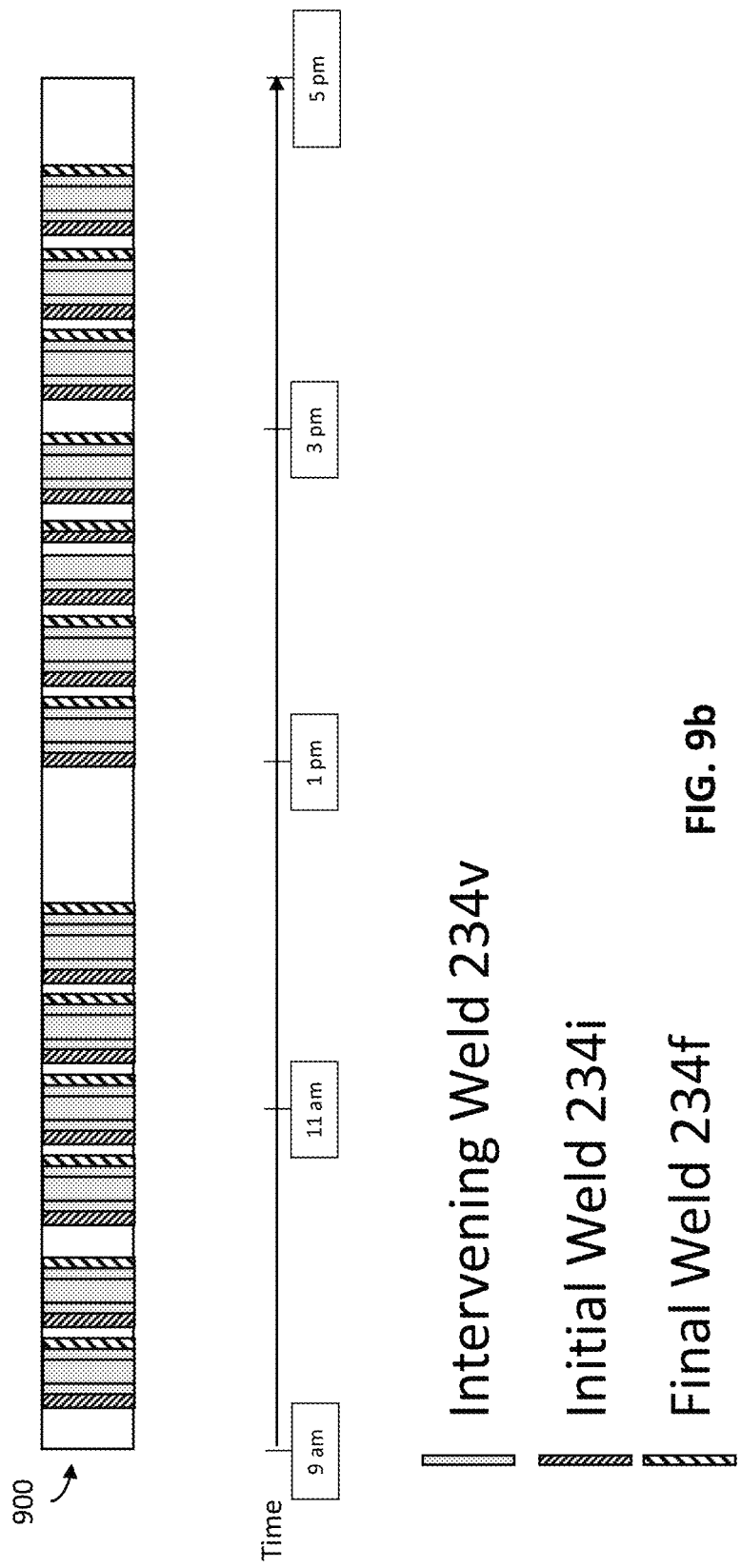

FIGS. 9a-9c show an example eight hour time period 900 for an example welding system 100 to help illustrate the part tracking program 300. In the example of FIG. 9a, the part tracking program 300 has collected sensor data 218 during (and/or corresponding to) the time period 900 (e.g., block 302). Additionally, the part tracking program 300 has identified individual welds 234 (e.g., of the identified welds 222) that occurred during the time period 900, and associated each weld 234 with one or more feature characteristics 220 (e.g., blocks 304 and 306). However, at this point, none of the welds 234 have been associated with a part 236.

In some examples, the part tracking program 300 may output (e.g., via the UI 216 and/or operator interface 144) one or more graphical representations of the identified welds 222 similar to the diagram of the time period 900 shown in FIG. 9a. In some examples, the part tracking program 300 may also output other information relating to such a diagram, such as, for example, dates, times, feature characteristics, and/or prompts to confirm and/or deny that the identified welds 222 are valid and/or reliable. In some examples, an output of such a diagram may occur at block 306 and/or subsequent to block 306 (as discussed below).

In some examples, the part tracking program 300 may output a diagram similar to the diagram shown in FIG. 9a as a prompt to solicit feedback from a user. For example, a user may see a diagram similar to FIG. 9a, and immediately recognize that certain consecutive welds 234 make up one or more parts, or that certain welds 234 should be ignored. In such an example, a user to may provide one or more inputs (e.g., via the UI 216 and/or operator interface 144) that inform the part tracking program 300 that certain selected consecutive welds 234 should be associated with one or more parts 236 (and/or types of parts 236), or should be ignored. The part tracking program 300 may then save this information (e.g., as part of the known constraints 226) and/or use the information during analysis.

In the example of FIG. 3, the part tracking program 300 proceeds to block 400 after block 306. At block 400, the part tracking program 300 analyzes some or all of the identified welds 222 to develop and/or determine one or more part models 232 that may be applicable to the identified welds 222. In some examples, one or more of the part models 232 may be a neural net, a statistical model, or a data set collection (e.g., a collection of parts 236 and/or consecutive welds 234). In some examples, the development and/or determination of the applicable part models 232 at block 400 may use one or more machine learning techniques. An example implementation of block 400 is discussed in further detail with respect to FIG. 4 below.

In the example of FIG. 3, the part tracking program 300 proceeds to block 308 after block 400. At block 308, the part tracking program 300 selects and/or accesses one or more of the part models 232 developed and/or determined at block 400. In some examples, one or more of the part models 232 may be newly developed by the part tracking program 300. In some examples, one or more of the part models 232 may be pre-existing part models 232 accessed by the part tracking program 300.

In some examples, the selection of the one or more part models 232 may be based (at least partially) on one or more of the known constraints 226. In some examples, the part tracking program 300 may determine which part models 232 to select and/or access based on a confidence level associated with each part model 232 at block 400 of the part tracking program 300. In some examples, the number of part models 232 selected and/or accessed may be based on one or more feature characteristics 220.

In the example of FIG. 3, the part tracking program 300 proceeds to block 800 after block 400. At block 800, the part tracking program 300 applies the part model(s) 232 selected and/or accessed at block 308 to the identified welds 222 in order to identify one or more parts 236 (and/or type(s) of parts 236) produced by the identified welds 222. In some examples, this application may be done in real-time, as welding is performed and welds 234 are identified. In some examples, this application may be done on past welds 234.

In some examples, the application of the part model(s) 232 to identified welds 222 at block 800 may include analyzing groups of consecutive welds 234 in search of one or more part model 232 matches. In some examples, each part model 232 may model a part 236 with n welds, where n is an integer (e.g., 1, 2, 3, etc.). In some examples, each part model 232 may specify the value of n (e.g., in metadata, a readable file, some association, etc.) for that model 232. At block 800, the part tracking program 300 may analyze different n sized groups of consecutive welds 234 and identify those n consecutive welds 234 as a part 236 if the n consecutive welds 234 match the part model 232. In some examples, the part tracking program 300 may analyze smaller groups of consecutive welds 234 in real time, in an attempt to determine which part model 232 the consecutive welds 234 would most likely match when all n consecutive welds 234 were completed. In some examples, feature characteristics 220 (and/or other information) of each part 236 (e.g., part type, number of welds, etc.) may be saved and/or associated with the part 236. An example implementation of block 800 is discussed with respect to FIG. 800 below.

FIG. 9c shows an example of the time period 900 after block 800 of the part tracking program 300. As shown, the part tracking program 300 has identified several groups of consecutive welds 234 as parts 236. FIG. 9c also shows several welds 234 that have not been identified as parts 236. This may happen, for example, if the welds 234 fail to match any of the selected part models 232, such as if, for example, there is something atypical about that particular sequence of consecutive welds 234 (e.g., extra weld(s), missing weld(s), atypical feature characteristics 220 of weld(s) 234, etc.).

In some examples, the part tracking program 300 may output (e.g., via the UI 216 and/or operator interface 144) one or more graphical representations of identified parts 224 and/or identified welds 222 in a time period 900, similar to the diagram shown in FIG. 9c. In some examples, the part tracking program 300 may also output other information relating to such a diagram, such as, for example, dates, times, feature characteristics, and/or prompts to confirm and/or deny that the identified parts 224 are valid and/or reliable. In some examples, an output of such a diagram may occur at block 800, and/or subsequent to block 800 (as discussed below).

In some examples, the part tracking program 300 may output a diagram similar to the diagram shown in FIG. 9c as a prompt to solicit feedback from a user. For example, a user may see a diagram similar to FIG. 9c, and immediately recognize that certain identified parts 224 are of a certain type, should be labeled a certain way, and/or are correctly/incorrectly identified. In such an example, a user to may provide one or more inputs (e.g., via the UI 216 and/or operator interface 144) that inform the part tracking program 300 that certain selected parts 236 should be associated with a certain part type, should be labeled a certain way, and/or are correctly/incorrectly identified. The part tracking program 300 may then save this information (e.g., as part of the known constraints 226) and/or use the information during future analysis.

In the example of FIG. 3, the part tracking program 300 proceeds to block 310 after block 800. At block 310, the part tracking program 300 analyzes the newly identified parts 224 to determine one or more part quality metrics (e.g., a grade, score, etc.). The ability of the part tracking program 300 to identify parts 236 from a collection of welds 234 allows for an analysis of these identified parts 224, as opposed to just an analysis of identified welds 222.

In some examples, the part tracking program 300 may compare one or more parts 236 to an ideal part and/or typical part, and determine a quality metric of the part 236 based on the comparison. In some examples, the part tracking program 300 may determine the appropriate ideal and/or typical part for comparison based on a part type of the part 236 (e.g., determined at block 800). In some examples, one or more part models 232 may be used as ideal and/or typical parts. In some examples, the ideal and/or typical part may be part 236 having one or more welds 234 with one or more feature characteristics 220 that include statistical average and/or standard deviation values compiled from statistical analysis of many parts 236 of the appropriate part type (and/or part quality).

In some examples, the part tracking program 300 may determine quality metrics of a part 236 in real time. For example, the part tracking program 300 may identify welds 234 as they are performed, and/or parts 236 as they are assembled, in real time. In such an example, the part tracking program 300 may assume and/or predict that the next part 236 being created (e.g., by the newly identified weld(s) 234) is of the same type as the last part 236 that was created and/or identified.

In some examples, the part tracking program 300 may compare feature characteristics 220 of each newly identified weld 234 to feature characteristics 220 of an ideal part, typical part, and/or part model 232, as the weld 234 is identified. In some examples, the part tracking program 300 may output a notification (and/or alarm, communication, disable signal, etc.) if the quality metrics deviate more than a threshold amount from what is expected. Such a real time notification may allow an operator 116 to immediately fix whatever caused the deviation in real time, rather than having to go back and fix later, or failing to realize a fix was needed at all. In some examples, the part tracking program 300 may also output directions (e.g., via the UI 216 and/or operator interface 144) to guide an operator 116 through assembly of the part 236, to help minimize deviation from expectation.

In the example of FIG. 3, the part tracking program 300 proceeds to block 312 after block 310. At block 312, the part tracking program 300 analyzes the one or more of the newly identified parts 224 to determine one or more production and/or cost metrics (e.g., related to how long a part 236 took to produce, how much a part 236 cost to produce, how much gas, wire, and/or electricity was used to produce the part 236, etc.). This analysis may be done in real time, as welds 234 are identified, similar to that which is discussed above. Again, the ability of the part tracking program 300 to identify parts 236 from a collection of welds 234 allows for such a production and/or cost analysis of the identified parts 224, as opposed to just an analysis of identified welds 222.

In the example of FIG. 3, the part tracking program 300 proceeds to block 314 after block 312. At block 314, the part tracking program 300 performs one or more system actions, if necessary. For example, the metrics determined at blocks 310 and/or 312 may result in the part tracking system 200 generating one or more metric reports, messages, notifications, errors, and/or faults. As another example, the part tracking program 300 may generate one or more reports, messages, notifications, and/or faults in response to difficulty developing/determining an applicable part model 232 at block 400, selecting/accessing the applicable part model 232 at block 308, and/or identifying parts 236 at block 800.

In the example of FIG. 3, the part tracking program 300 proceeds to block 316 after block 314. At block 316, the part tracking program 300 incorporates and/or considers any feedback that has been received. For example, feedback may be received in response to an output of a diagram similar to one of the diagrams shown in FIGS. 9a-10. As another example, feedback may be received in response to one or more system actions taken at block 314. As another example, feedback may be received in response to, and/or in order to address, difficulty developing/determining an applicable part model 232 at block 400, difficulty selecting/accessing the applicable part model 232 at block 308, difficulty identifying parts 236 at block 800, and/or poor (or excellent) metrics at block 314 and/or 316. As another example, feedback may be received manually identifying particular groups of consecutive welds 234 as particular parts 236, and/or revising prior identification and/or labeling of particular groups of consecutive welds 234 as particular parts 236. As another example, feedback may be received instructing the part tracking program 300 to train one or more part models 232 using some data, or apply one or more particular part models 232 to identified welds 222. As another example, feedback may be received that revises and/or adds known constraints 226. While, in the example of FIG. 3, the part tracking program 300 ends after block 316, in some examples, the part tracking program 300 may return to block 302 (or any other block preceding block 316) after block 316.

Figure 4:
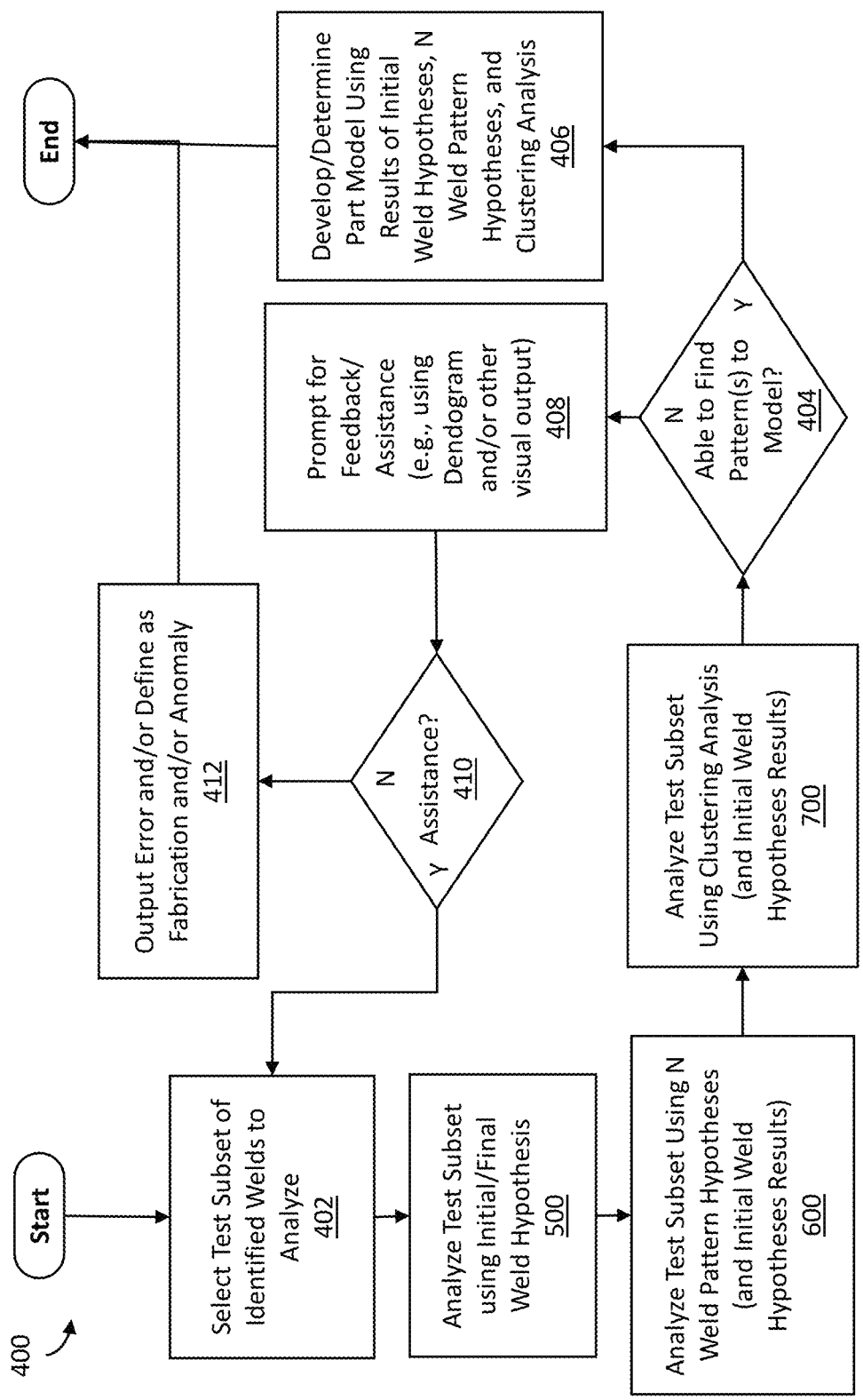

FIG. 4 is a flowchart illustrating details of an example develop/determine part model(s) block 400 of the part tracking program 300. As shown, the develop/determine part model(s) block 400 of the part tracking program 300 begins at block 402, where the part tracking program 300 selects a test subset of the identified welds 222. In some examples, the identified welds 222 may be too large to efficiently analyze in their entirety, and so a test subset may be selected. In some examples, selection of the test subset may be based on one or more of the known constraints 226. In some examples, all the identified welds 222 may be selected as the test subset.

In the example of FIG. 4, the part tracking program 300 proceeds to block 500 after block 402. At block 500, the part tracking program 300 analyzes the welds 234 of the test subset using an initial and/or final weld hypothesis. In some examples, the initial and/or final weld hypothesis analysis may analyze welds 234 of the test subset looking for welds 234 similar to typical initial and/or final welds 234 of a part 236. For example, initial welds 234 of a part 236 are usually preceded by (and final welds 234 are usually succeeded by) a non-welding time period that is significantly longer than any non-welding time period that occurs before and/or after intermediate welds. This may be due to having to clamp a new workpiece 110 in place, change tips on the welding torch 118, adjust settings on the power supply 108, and/or other setup procedures that may be needed before starting a new part 236. As another example, initial welds are usually the first welds completed at the beginning of a shift or after a break, and final welds are usually the last welds completed before a break or end of a shift. This may be due to a tendency of operators 116 to finish a part 236 before leaving on a break or for the day, and/or a reluctance to leave a part 236 unfinished when going on break or leaving for the day.

Figure 5:
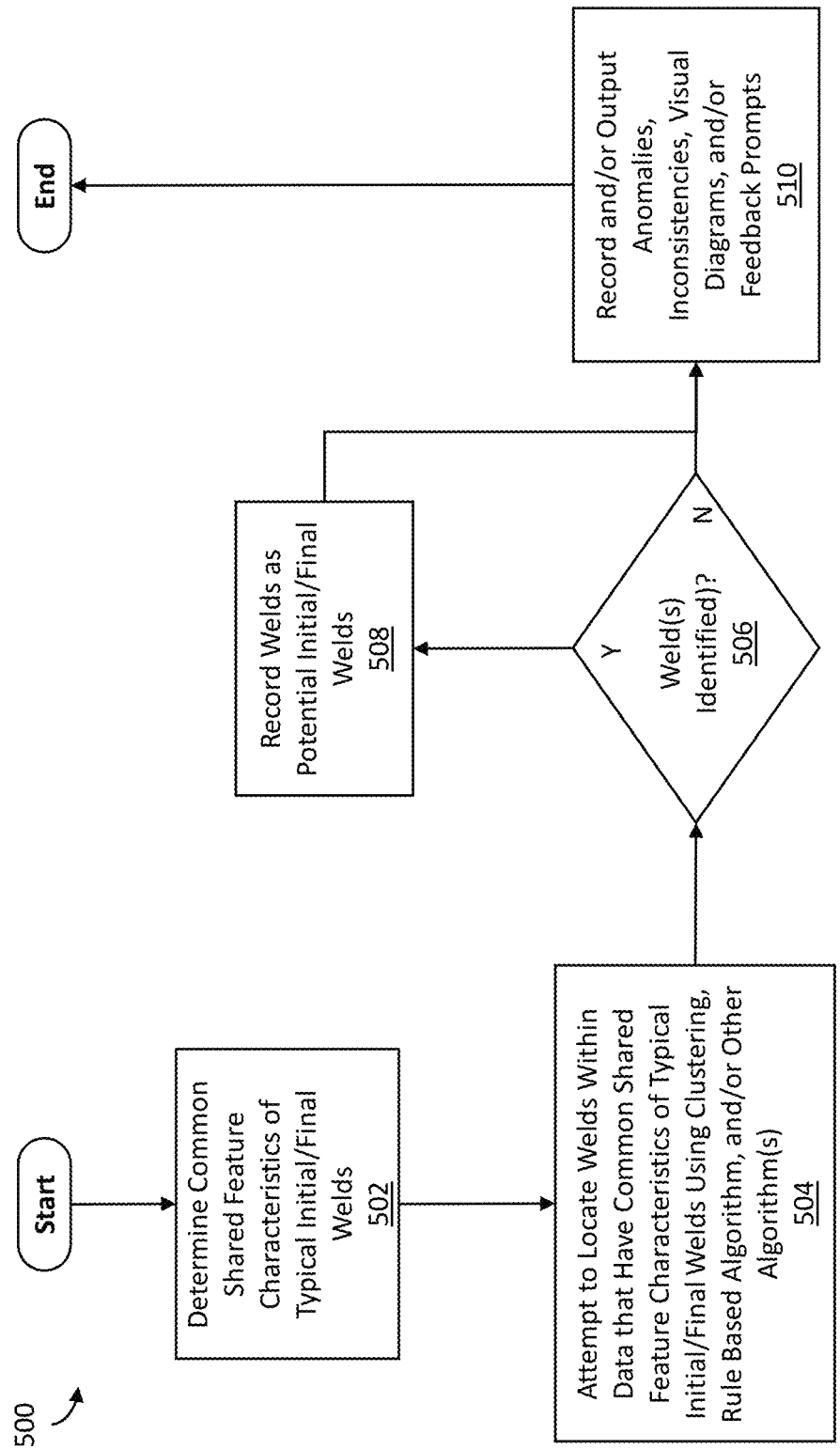

FIG. 5 is a flowchart illustrating details of an example initial/final weld hypothesis block 500 (of the develop/determine part model(s) 232 block 400) of the part tracking program 300. As shown, the initial/final weld hypothesis analysis block 500 of the part tracking program 300 begins at block 502, where the part tracking program 300 determines one or more feature characteristics 220 common to initial and/or final welds 234. In some examples, this determination may pertain to both categories of feature characteristics 220 that will be used in the analysis (e.g., time since last weld, time until next weld, false weld/arc flag, previous event, etc.) as well as typical values in those categories (e.g., 15 minutes). In some examples, the categories and/or values may be predetermined, saved in memory, and/or input by a user (e.g., via UI 216 and/or operator interface 144). In some examples, the values may be thresholds, threshold ranges, thresholds with standard deviations, text values, and/or other appropriate values. In some examples, the categories and/or values may be part of, and/or determined based on, the known constraints 226.

In the example of FIG. 5, the part tracking program 300 proceeds to block 504 after block 502. At block 504, the part tracking program 300 uses the categories and values of feature characteristics 220 determined at block 502 to identify welds 234 within the test subset that may be initial and/or final welds 234. In some examples, the part tracking program 300 may look for values that are the same as, or within some threshold range of, the value(s) determined at block 502. For example, where the value determined at block 502 is 15 minutes with a standard deviation of 5 minutes, the part tracking program 300 may look for welds 234 within the test subset having a time since last weld 234 of 10 minutes or more. In some examples, the part tracking program 300 may use a rules based algorithm to find welds 234 feature characteristics 220 that match and/or are within the threshold range (or greater/less than threshold). In some examples, the part tracking program 300 may use a clustering algorithm to find clusters of welds 234 that have values that match and/or are within the threshold range (or greater/less than threshold). In some examples, the part tracking program 300 may use some other algorithm, such as a machine learning algorithm, for example. In some examples, the clustering algorithm and/or rule based algorithm may be considered machine learning algorithms.

In the example of FIG. 5, the part tracking program 300 proceeds to block 506 after block 504. At block 506, the part tracking program 300 determines whether any welds 234 were identified as potential initial/final welds 234 at block 504. If so, the part tracking program 300 proceeds to block 508, where the part tracking program 300 records (e.g., in memory) the welds 234 that have been identified as potential initial/final welds 234.

In some examples, the part tracking program 300 may also determine at block 508 whether there are a relatively consistent number of intervening welds 234v between pairs of initial welds 234i, or pairs of final welds 234f. For example, if the initial/final weld hypothesis analysis is sufficiently accurate and/or precise, the part tracking program 300 may successfully identify all, or nearly all, initial/final welds 234 in the test subset. In such an example, the part tracking program 300 may find that the same number of intervening welds 234v always (or almost always—e.g., at or above a threshold percentage) separate adjacent initial welds 234i, or adjacent final welds 234f. In some examples, the part tracking program 300 may determine the number of welds 234 in a part 236 based on the number of typical welds 234 separating adjacent pairs of initial welds 234i and/or final welds 234f. If the part tracking program 300 finds a relatively consistent number of intervening welds 234v separate adjacent pairs of initial welds 234i and/or final welds 234f, the part tracking program 300 may determine that each part 236 has a number of welds 234 equal to the number of intervening welds 234v plus one.

In the example of FIG. 5, the part tracking program 300 proceeds to block 510 after block 508. The part tracking program 300 also proceeds to block 510 after block 506 if the part tracking program 300 fails to identify any (or above a threshold amount of) initial and/or final welds 234. At block 510, the part tracking program 300 records any anomalies, inconsistencies, failures, and/or errors that may have occurred during the initial/final weld hypothesis analysis block 500. For example, the part tracking program 300 may find that there is no typical number of intervening welds 234v between adjacent initial/final weld pairs, or that very few (e.g., below a threshold amount) of initial welds 234i and/or final welds 234f were identified. In such examples, the part tracking program 300 may save that information for later presentation (e.g., at block 408 of the part tracking program 300). In some examples, the part tracking program 300 may additionally record information that will allow the part tracking program 300 to present one or more visual diagrams (e.g., dendogram(s)) and/or feedback prompts that might help induce a user to provide additional information to help the initial/final weld hypothesis be more effective and/or efficient. In some examples, the part tracking program 300 may output (e.g., to the UI 216) the anomalies, inconsistencies, failures, errors, visual diagrams, and/or prompts at block 510, rather than waiting until block 408. In the example of FIG. 5, the initial/final weld hypothesis analysis block 500 ends after block 510.

FIG. 9b shows an example of the time period 900 after the initial/final weld hypothesis analysis block 500 of the part tracking program 300. As shown, the part tracking program 300 has identified several potential initial welds 234i and final welds 234f. The non-welding portions of the time period 900 that precede the initial welds 234i, and succeed the final welds 234f, are shown as being longer than non-welding portions preceding and/or succeeding other welds 234 in the time period 900. In some examples, these longer non welding time periods before initial welds 234i and/or after final welds 234f may be a helpful factor in identifying the initial welds 234i and/or final welds 234f, as discussed above. However, this can also lead to some false identifications, such as if an operator 116 takes an unexpected break in the middle of assembling a part 236 (e.g., for maintenance, bathroom, etc.). In some examples, the welds 234 in the time period 900 not identified as initial welds 234i or final welds 234f may be considered intervening welds 234v.

In some examples, the part tracking program 300 may output (e.g., via the UI 216 and/or operator interface 144) one or more graphical representations of the initial welds 234, final welds 234, and/or intervening welds 234i, similar to the diagram of the time period 900 shown in FIG. 9b. In some examples, the part tracking program 300 may also output other information relating to such a diagram, such as, for example, dates, times, feature characteristics, and/or prompts to confirm and/or deny that the initial welds 234, final welds 234, and/or intervening welds 234i are valid and/or reliable. In some examples, an output of such a diagram may occur at anytime during block 500, and/or subsequent to block 500.

In some examples, the part tracking program 300 may output a diagram similar to the diagram shown in FIG. 9b as a prompt to solicit feedback from a user. For example, a user may see a diagram similar to FIG. 9b, and immediately recognize that certain initial welds 234, final welds 234, and/or intervening welds 234i make up one or more parts, are correctly/incorrectly identified, and/or should be ignored (e.g., as anomalies). In such an example, a user to may provide one or more inputs (e.g., via the UI 216 and/or operator interface 144) that inform the part tracking program 300 that certain initial welds 234, final welds 234, and/or intervening welds 234i are correctly/incorrectly identified, should be associated with one or more parts 236 (and/or types of parts 236), and/or should be ignored. The part tracking program 300 may then save this information (e.g., as part of the known constraints 226) and/or use the information during future analysis.

In the example of FIG. 4, the part tracking program 300 proceeds to block 600 after the initial/final weld hypothesis analysis block 500. At block 600, the part tracking program 300 analyzes the welds 234 of the test subset using an N weld pattern hypothesis analysis. In some examples, the N weld pattern hypothesis analysis may analyze consecutive welds 234 of the test subset in an attempt to identify repeating patterns of N consecutive welds 234. In some examples, the part tracking program 300 may iterate through different N values, attempting to identify repeating patterns of N consecutive welds 234 for each different value of N.

Figure 6:
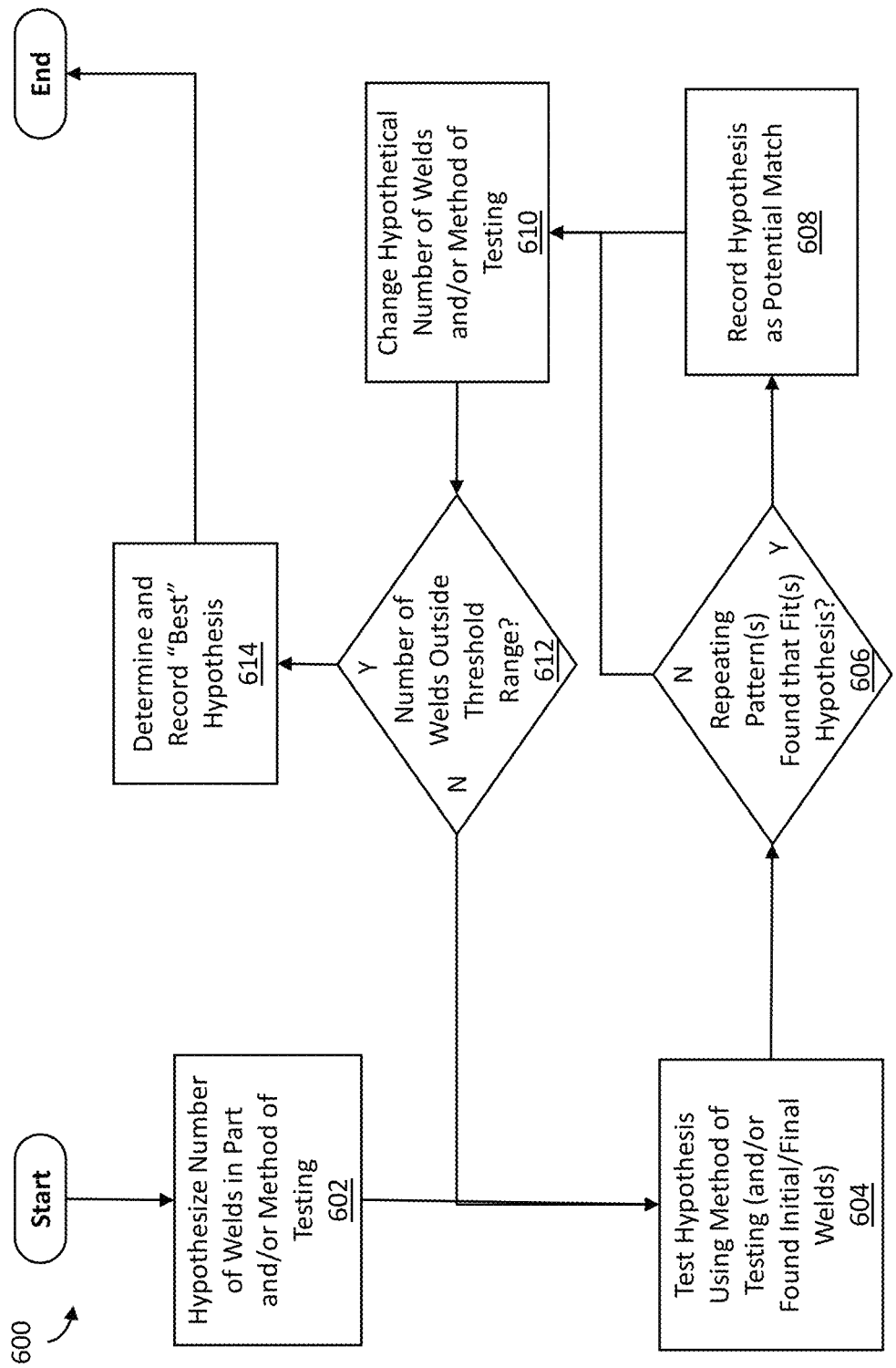

FIG. 6 is a flowchart illustrating details of an example N weld hypothesis analysis block 600 (of the develop/determine part model(s) 232 block 400) of the part tracking program 300. As shown, the N weld hypothesis analysis block 600 of the part tracking program 300 begins at block 602, where the part tracking program 300 determines an N weld hypothesis to test. In some examples, the N weld hypothesis may include a number of welds 234 (i.e., N) and/or an algorithm to test the hypothesis. In some examples, the algorithm may be a machine learning algorithm. In some examples, the algorithm may be a correlation algorithm (e.g., cross correlation/classification algorithms, a multi-dimensional distance metric algorithm, a statistical algorithm, etc.). In some examples, the correlation algorithm may be considered a machine learning algorithm.

Different algorithms may be more or less effective at testing an N weld hypothesis, depending on the data being tested (e.g., the test subset). In some examples, the part tracking program 300 may determine the algorithm to test the hypothesis based on one or more known constraints 226 and/or feature characteristics 220. In some examples, the part tracking program 300 may choose one algorithm to test the N weld hypothesis initially and then subsequently test using one or more different algorithms.

In some examples, the part tracking program 300 may use an initial N value of 1. In some examples, the part tracking program 300 may use a different initial N value (e.g., 2, 3, 4) based on user input, a saved default, or some predetermination. In some examples, the part tracking program 300 may determine an initial N value based on a number of typical intervening welds 234 found by the initial/final weld hypothesis block 500.

In some examples, the part tracking program 300 may determine an initial N value based on one or more known constraints 226 and/or feature characteristics 220. For example, the known constraints 226 may indicate that most parts 236 produced by a particular operator 116 and/or a particular shift are x type parts 236, or have y number of welds 234 (or between y and z welds 234). In such an example, the part tracking program 300 may determine whether the welds 234 in the test subset were performed by that particular operator 116 and/or on that particular shift. If so, the part tracking program 300 may set the beginning N value to be y (or z), or determine what the typical number (and/or number range) of welds 234 is for x type parts 236 (e.g., via a lookup in memory).

In the example of FIG. 6, the part tracking program 300 proceeds to block 604 after block 602. At block 604, the part tracking program 300 tests the N weld hypothesis determined at block 602 using a testing algorithm and an N value. In some examples, the part tracking program 300 may use a particular testing algorithm specified by and/or associated with the N weld hypothesis to test the N weld hypothesis, as discussed above. In some examples, the part tracking program 300 may analyze the test subset of identified welds 222 for a pattern of N consecutive welds 234 that appear to repeat, using the testing algorithm. In some examples, the part tracking program 300 may initially assume that one or more of the repeating patterns will begin at one or more initial welds 234*i* (and/or end at one or more final welds 234*f*) identified by the initial/final weld hypothesis analysis block 500.

In some examples, the part tracking program 300 may determine a match metric at block 604 representative of a degree to which the part tracking program 300 was successful in finding a repeating pattern of N consecutive welds 234 in the test subset of identified welds 222 using the testing algorithm. For example, the match metric may be a percentage, a grade, a score, and/or some other appropriate metric. In some examples, the part tracking program 300 may further determine a confidence metric representative of a degree to which the match metric is likely to be accurate.

In the example of FIG. 6, the part tracking program 300 proceeds to block 606 after block 604. At block 606, the part tracking program 300 determines whether the match metric and/or confidence metric of the N weld hypothesis test performed at block 604 are above a threshold (and/or within a threshold range). In some examples, this threshold (and/or threshold range) may be predetermined, stored in memory, and/or determined based on one or more known constraints 226 and/or feature characteristics 220.

In the example of FIG. 6, the part tracking program 300 proceeds to block 608 after block 606 if the part tracking program 300 determines the match metric (and/or confidence metric) is above the threshold (and/or within the threshold range). At block 608, the part tracking program 300 records (e.g., in memory) the N weld hypothesis as a potential match. In some examples, the part tracking program 300 may also record the associated match metric and/or confidence metric.

In the example of FIG. 6, the part tracking program 300 proceeds to block 610 after block 608. As shown, the part tracking program 300 also proceeds to block 610 after block 606 if the part tracking program 300 determines the match metric (and/or confidence metric) is not above the threshold (and/or within the threshold range). At block 610, the part tracking program 300 changes the N weld value and/or the testing algorithm of the N weld hypothesis. In some examples, the part tracking program 300 may change the N value by a single increment, up or down (e.g., +1 or −1). In some examples, the increment may be greater than one. In some examples, the part tracking program 300 may determine the increment amount (and/or direction) based on one or more known constraints 226 and/or feature characteristics 220.

In the example of FIG. 6, the part tracking program 300 proceeds to block 612 after block 610. At block 612, the part tracking program 300 determines whether the new N value is outside of a threshold range, greater than an upper threshold, or lower than a lower threshold. In some examples, the threshold(s) may be predetermined and/or stored in memory. In some examples, the threshold(s) may be a certain percentage of the test subset (e.g., N cannot be greater than 25% of subset, or 50% of subset).

In some examples, the part tracking program 300 may determine the threshold(s) based on one or more known constraints 226 and/or feature characteristics 220. For example, the known constraints 226 may indicate that most parts 236 produced by a particular operator 116 and/or a particular shift have between x and y welds 234. In such an example, the part tracking program 300 may determine the upper threshold to be x (or x+1) and/or the lower threshold to be y (or y−1). As shown, the part tracking program 300 returns to block 604 after block 612 if the part tracking program 300 determines the N value is not outside the threshold range.

In the example of FIG. 6, the part tracking program 300 proceeds to block 614 after block 612 if the part tracking program 300 determines the N value is outside the threshold range. At block 614, the part tracking program 300 determines which of the N weld hypotheses recorded at block 608 best fit the test subset. In some examples, the part tracking program 300 may make this determination based on a comparison of the various match and/or confidence metrics of the recorded N weld hypotheses.

In some examples, the part tracking program 300 may keep (e.g., record and/or store) the N weld hypothesis with the best (e.g., highest) match metric. In some examples, the part tracking program 300 may keep (e.g., record and/or store) the N weld hypothesis with the best (e.g., highest) combined match and confidence metric. In some examples, the part tracking program 300 may keep (e.g., record and/or store) multiple N weld hypothesis (e.g., top 2, 3, etc.).

In some examples, the part tracking program 300 may discard an N weld hypothesis with an N value that is a multiple of a different kept N weld hypothesis. For example, the part tracking program 300 may keep a 5 weld hypothesis and discard 10, 15, and 20 weld hypotheses in the assumption that the 10, 15, and 20 weld patterns are simply repeating 5 weld patterns. In some examples, the part tracking program 300 may discard the N weld hypotheses that are not best fits, or have match metrics (or combined metrics) that are too low (e.g., below a threshold). In some examples, the part tracking program 300 may record an error or fault, or hypothesize a fabrication procedure is taking place, where there are no best fit N weld hypotheses to record. As shown, the N weld hypothesis analysis block 600 ends after block 614.

In the example of FIG. 4, the part tracking program 300 proceeds to block 700 after the N weld hypothesis analysis block 600. At block 700, the part tracking program 300 analyzes the welds 234 of the test subset using a clustering analysis. In some examples, the clustering analysis may attempt to group the welds 234 of the test subset into several "clusters" based on common shared feature characteristics 220 and/or different feature characteristics 220 of the welds 234. By analyzing the number of distinct clusters/groups, as well as the extent to which each group is distinct from the rest of the clusters/groups, the part tracking program 300 may be able to determine the number of welds 234 used to assemble each part 236.

Figure 7:
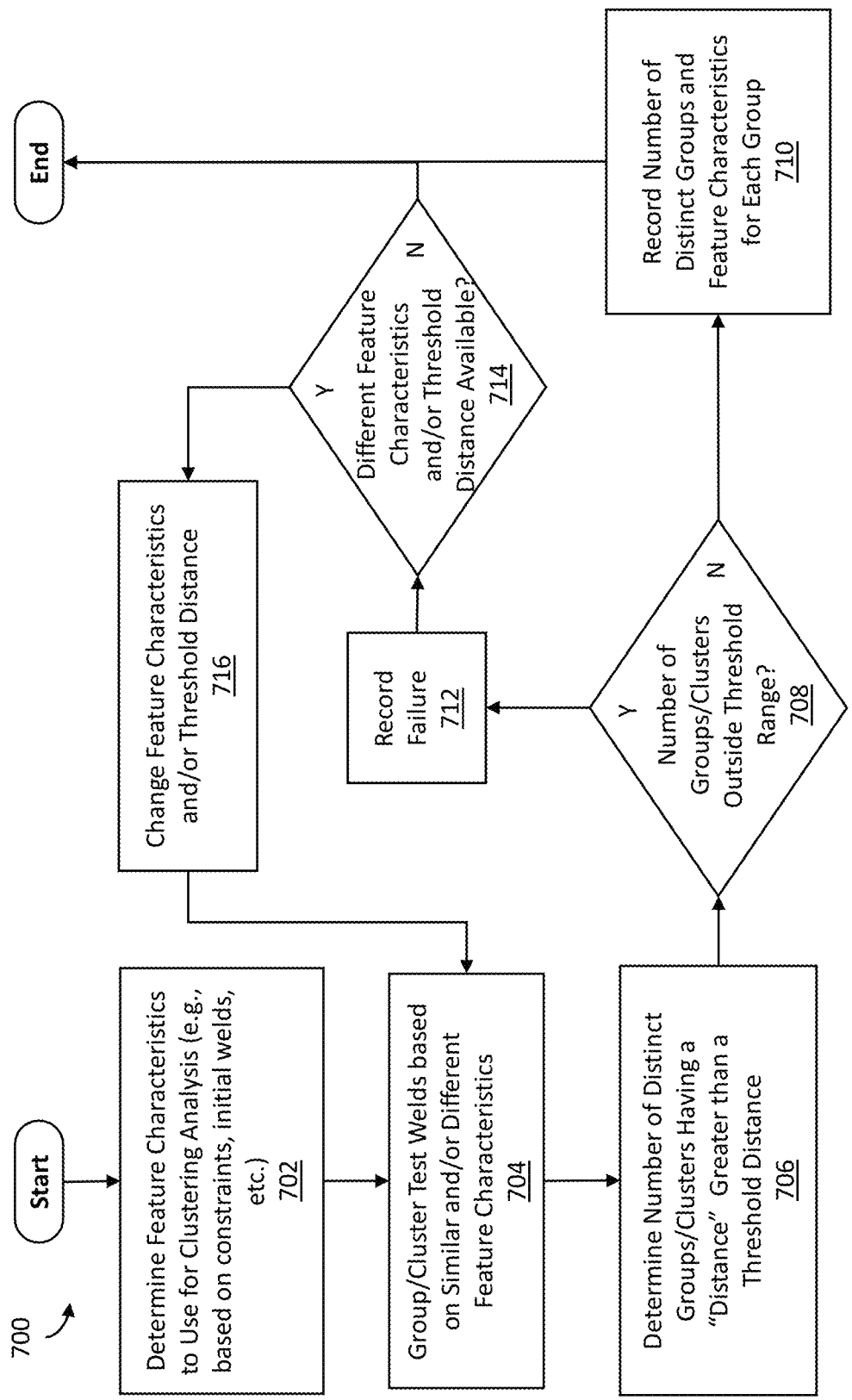

FIG. 7 is a flowchart illustrating details of an example clustering analysis block 7 of the (of the develop/determine part model(s) 232 block 400) of the part tracking program 300. As shown, the clustering analysis block 700 of the part tracking program 300 begins at block 702 where the part tracking program 300 may determine one or more categories of feature characteristics 220 to use in the clustering analysis. In some examples, the part tracking program 300 may select certain specific categories of feature characteristics 220 that are more helpful to the clustering analysis to use (e.g., voltage, current, weld duration, weld position, etc.) and cluster based on only those categories. In some examples, the categories may be predetermined and/or stored in memory. In some examples, the part tracking program 300 may determine the categories based on one or more known constraints 226 and/or feature characteristics 220. In some examples, the part tracking program 300 may exclude one or more categories used in the initial/final weld hypothesis analysis block 500 (as those might result in clusters of initial welds 234*i*, final welds 234*f*, and intervening welds 234).

In the example of FIG. 7, the part tracking program 300 proceeds to block 704 after block 702. At block 704, the part tracking program 300 performs a clustering analysis of the welds 234 in the test subset using the categories of feature characteristics 220 selected at block 702. In some examples, the clustering analysis may attempt to group the welds 234 of the test subset into several clusters based on similar and/or different feature characteristic 220 values of the welds 234. By analyzing the number of distinct clusters/groups, as well as the extent to which each group is distinct from the rest of the clusters/groups (e.g., the "distance"), the part tracking program 300 may be able to determine the number of welds 234 in each part 236.

In the example of FIG. 7, the part tracking program 300 proceeds to block 706 after block 704. At block 706, the part tracking program 300 determines the number of distinct clusters/groups having a "distance" from another group (or from all other groups) greater than a threshold. In some examples, the "distance" by which one group is separate from another may be representative of the extent to which the two groups are distinct from one another. In some examples, the threshold may be stored in memory, set via user input, and/or determined based on one or more of the known constraints 226 and/or feature characteristics 220.

Figure 10:
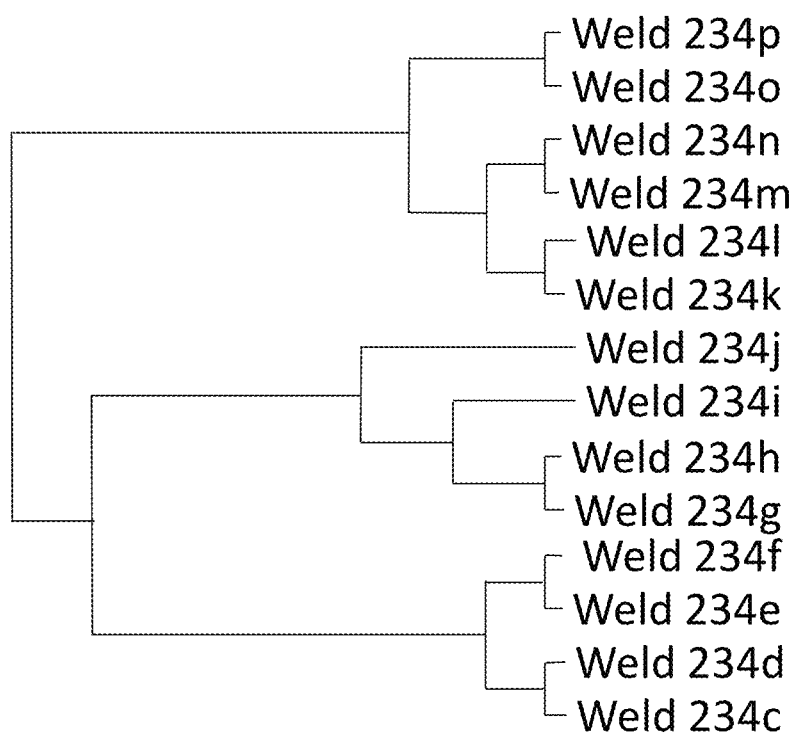
FIG. 10 is an example of a dendogram that might be generated by the part tracking system of FIG. 2a to illustrate results of a clustering analysis, in accordance with aspects of this disclosure.

FIG. 10 shows an example of a dendogram 1000 that provides a visual depiction of a clustering analysis. As shown, fourteen welds 234*c*-234*p* are clustered. The "distance" from one weld 234 to another (i.e., the degree to which one weld 234 is distinct from another based on the analyzed feature characteristics 220) is represented by the vertical lines (aka "legs"). For example, the distance between weld 234*c* and weld 234*d* is very short, while the distance between weld 234*c* and weld 234*e* is longer. Some groups of welds 234 are the same distance from other welds 234. For example, welds 234*c* and weld 234*d* are both approximately the same distance from weld 234*e*.

In the example of FIG. 10, welds 234*c-f* might be identified as a distinct group (e.g. group 1) in view of the significant distance that separates those welds 234 from all other welds 234 in the dendogram 1000. In some examples, this large shared distance may indicate a high degree of distinctiveness. Such distinctiveness may indicate that each weld 234 in group 1 is the same weld 234 of a part 236 (assuming all the welds 234*c-f* were used to assemble the same type of part 236). As shown, welds 234*g-j* might also be identified as a distinct group (e.g., group 2), and welds 234*k-p* might be identified as another distinct group (e.g., group 3), for similar reasons. In some examples, the high degree of distinctiveness between these three groups might indicate to the part tracking program 300 that each part 236 being produced by these welds 234 typically consists of three welds 234. Further, the fact that there are four welds 234 in group 1, four welds 234 in group 2, and six welds 234 in group 3 might indicate that four parts 236 were created by these welds 234. In some examples, the other two welds 234 in group 3 might be anomalies, repairs, or welds 234 on the edge of the test subset, such that the other welds 234 from their respective part 236 were not included in the test subset.

In some examples, the part tracking program 300 may output (e.g., via the UI 216 and/or operator interface 144) one or more dendograms 1000 similar to the dendogram 1000 shown in FIG. 10. In some examples, the part tracking program 300 may also output other information relating to the dendogram 1000, such as, for example, dates, times, feature characteristics, and/or prompts to confirm and/or deny the groupings in the dendogram 1000 are valid and/or reliable. In some examples, the part tracking program 300 may output a horizontal line that shows from what height in the dendogram 1000 the part tracking program 300 is taking its groupings. In some examples, an output of such a dendogram 1000 may occur at any time during block 700, and/or at other times.

In some examples, the part tracking program 300 may output a dendogram 1000 as a prompt to solicit feedback from a user. For example, a user may see a dendogram 1000 similar to FIG. 10, and immediately recognize that certain welds 234 should be grouped and/or ungrouped, or that the horizontal line indicating from what height in the dendogram 1000 the part tracking program 300 is taking its groupings should be raised and/or lowered. In such an example, a user to may provide one or more inputs (e.g., via the UI 216 and/or operator interface 144) that inform the part tracking program 300 that certain welds 234 should be grouped and/or ungrouped, or that the horizontal line should be raised/lowered. The part tracking program 300 may then save this information (e.g., as part of the known constraints 226) and/or use the information during analysis.

In the example of FIG. 7, the part tracking program 300 proceeds to block 708 after block 706. At block 708, the part tracking program 300 determines whether the number of distinct groups of welds 234 identified at block 708 is outside of a threshold range. For example, the part tracking program 300 may check to see if the number of groups is too low or high to be considered accurate (e.g., unlikely a part 236 was produced by only 2 welds 234, produced by 100 welds 234, or produced by more than half the welds 234 in the test subset). In some examples, the threshold range may be stored in memory, set via user input, and/or determined based on one or more of the known constraints 226 and/or feature characteristics 220.

In the example of FIG. 7, the part tracking program 300 proceeds to block 710 after block 708 if the part tracking program 300 determines the number of groups/clusters identified at block 706 is not outside the threshold range. At block 710, the part tracking program 300 records (e.g., in memory) the number of groups/clusters determined at block 706. In some examples, the part tracking program 300 may also record the groupings of welds 234 and/or their feature characteristics 220 for later use in developing one or more part models 232. In some examples, the part tracking program 300 may also record a confidence metric representative of a degree to which the number of groups/clusters determined at block 706 is likely to be accurate. In some examples, the part tracking program 300 may also output a dendogram 1000 (and/or save data sufficient to later output a dendogram 1000) representative of results of the clustering analysis. As shown, the clustering analysis block 700 (of the develop/determine part model(s) 232 block 400) of the part tracking program 300 ends after block 710.

In the example of FIG. 7, the part tracking program 300 proceeds to block 712 after block 708 if the part tracking program 300 determines the number of groups/clusters identified at block 706 is outside the threshold range. At block 712, the part tracking program 300 records the result of the clustering analysis to be a failure. In some examples, this may indicate to other portions of the part tracking program 300 that the clustering analysis was unable to make a reliable determination using the selected feature characteristics 220 and/or threshold(s).

In the example of FIG. 7, the part tracking program 300 proceeds to block 714 after block 712. At block 714, the part tracking program 300 determines whether there are different feature characteristics 220 that should be used do perform the clustering analysis, and/or if there are one or more different threshold ranges that should be used as criteria. In some examples, the part tracking program 300 may prompt a user or administrator for input in making the determination, and make the determination based on the input. In some examples, the part tracking program 300 may output a dendogram 1000 (and/or save data sufficient to later output a dendogram 1000) representative of results of the clustering analysis (e.g. in order to assist a user in understanding the clustering results and/or providing feedback). In some examples, the part tracking program 300 may output the dendogram 1000 and/or prompt for input/feedback as part of block 408 of the part tracking program 300.

In the example of FIG. 7, the part tracking program 300 proceeds to block 716 after block 714 if the part tracking program 300 determines there are different feature characteristics 220 and/or threshold range(s) that should be used. At block 716, the part tracking program 300 changes the feature characteristics 220 and/or threshold range. In some examples, the change may be based on input received at blocks 714 and/or 408. As shown, the part tracking program 300 returns to block 704 after block 716. In the example of FIG. 7, the clustering analysis block 700 (of the develop/determine part model(s) 232 block 400) of the part tracking program 300 ends after block 714 if the part tracking program 300 determines that there are not different feature characteristics 220 and/or threshold range(s) that should be used.

In the example of FIG. 4, the part tracking program 300 proceeds to block 404 after the clustering analysis block 700. At block 404, the part tracking program 300 determines whether the analysis of blocks 500-700 were able to find one or more sufficiently reliable patterns of welds 234. In some examples, this determination may involve checking to see whether the N weld hypothesis analysis block 600 or clustering analysis block 700 recorded a failure and/or error, and/or if the initial/final weld hypothesis analysis block 500 was able to independently determine a likely number of those welds 234 used to create a single part 236.

In the example of FIG. 4, the part tracking program 300 proceeds to block 406 after block 404 if the part tracking program 300 determines at least one of blocks 500-700 were able to identify a number of welds 234 (i.e., N) used to create a single part 236. At block 406, the part tracking program 300 develops and/or determines one or more applicable part models 232 based on the results of blocks 500-700.

In some examples, the part model(s) 232 may be one or more neural nets trained on N consecutive welds 234 of one or more N weld parts 236 identified in blocks 500-700. In some examples, the part model(s) 232 may be one or more N weld statistical models. In some examples, each N weld statistical model may be a part 236 with N welds 234, where the feature characteristic 220 values of each weld 234 have been reduced (e.g., by taking averages and/or standard deviations of one or more N weld parts 236 identified in blocks 500-700). In some examples, the part model(s) 232 may be one or more data set collections comprising a collection of N weld parts 236 identified in blocks 500-700.

In some examples, the part tracking program 300 may determine that an applicable part model 232 has been previously developed, in which case, the part model 232 may be loaded from memory. In some examples, an existing part model 232 may be updated via the new N weld parts 236 identified in blocks 500-700. In some examples, the part tracking program 300 may first analyze the new N weld parts 236 identified in blocks 500-700 in view of an existing part model 232 (e.g., using a clustering analysis, statistical analysis, neural net, etc.) to determine whether the existing part model 232 is applicable, or a new part model 232 should be created. In the example of FIG. 4, the develop/determine applicable part model(s) block 400 of the part tracking program 300 ends after block 406.

In the example of FIG. 4, the part tracking program 300 proceeds to block 408 after block 404 if the part tracking program 300 determines none of blocks 500-700 were able to identify a number of welds 234 used to create a single part 236. At block 408, the part tracking program 300 prompts for feedback and/or assistance from a user or administrator, such as, for example, via the UI 216, operator interface 144, and/or one or more communications. In some examples, the part tracking program 300 may seek feedback and/or assistance with respect to selecting a different test subset, different feature characteristics to use for the initial/final weld hypothesis and/or clustering analysis, different constraints 226, and/or other information. In some examples, the part tracking program 300 may output a description of the issue, one or more visual representations of the failed analysis (e.g., dendogram 1000), and/or other information that might assist in eliciting feedback.

In the example of FIG. 4, the part tracking program 300 proceeds to block 410 after block 408. At block 410, the part tracking program 300 determines whether feedback and/or assistance was provided at block 408 (and/or prior to block 408). If so, the part tracking program 300 returns to block 402 to attempt to again determine and/or develop the part model(s) 232 using the feedback and/or assistance. If not, the part tracking program 300 proceeds to block 412 where the part tracking program 300 outputs an error and/or postulates that the test subset (and/or all the identified welds 222) comprise a fabrication process or anomaly with no identifiable and/or repeatable pattern. In some examples, block 412 may interrupt the rest of the part tracking program 300. As shown, the develop/determine part model(s) block 400 of the part tracking program 300 ends after block 412.

Figure 8:
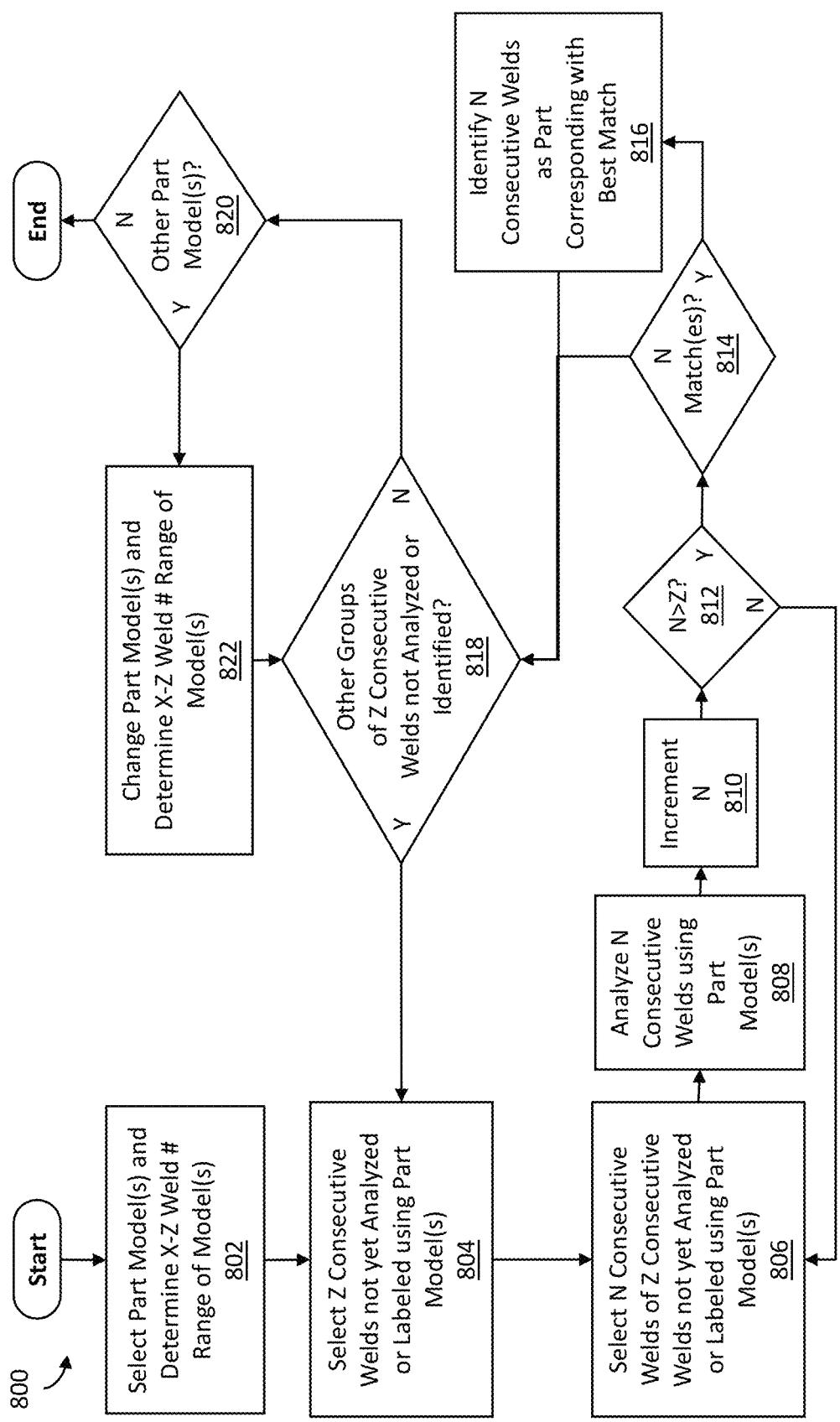

FIG. 8 is a flowchart illustrating an example apply part model(s) block 800 of the part tracking program 300. In some examples, block 800 may be applied to previously identified welds 222. In some examples, block 800 may be applied in real time as welding is performed and welds 234 are identified.

In the example of FIG. 8, the apply part model(s) block 800 of the part tracking program 300 begins at block 802. At block 802, the part tracking program 300 selects one or more of the part models 232 developed and/or accessed by the part tracking program 300 at block 308. In examples where the part tracking program 300 selects more than one part model 232, the part models 232 may be of all the same type (e.g., all statistical models, all neural nets, all data set collections). In some examples, only one part model 232 may be needed (e.g., one big data set collection of several different types of parts 236, one neural net having been trained on welds 234 from several different types of parts 236).

In some examples, the part tracking program 300 may also determine the number of welds 234 in each part 236 represented by the part model(s) 232 selected at block 802 (e.g., via information within and/or associated with the part model 232). In some examples, even a single part model 232 may represent several different parts 236, each with a different number of welds 234. For example, a data collection part model 232 may include a collection of several different types of parts 236, each with a different number of welds 234. As another example, a neural net may be trained on a data collection having several different types of parts 236, each with a different number of welds 234. In some examples, the part tracking program 300 may determine an X-Z number range of the welds 234 of the different parts 236 represented by the part model(s) 232 (e.g., where X and Z are integers and X<=Z.).

In the example of FIG. 8, the part tracking program 300 proceeds to block 804 after block 802. At block 804, the part tracking program 300 selects Z consecutive welds 234 (e.g., of the identified welds 222) that have yet to be labeled as belonging to a part 236 of the identified parts 224, and yet to be analyzed using the currently selected part model(s) 232. In examples where block 800 is applied in real time as welding is performed and welds 234 are identified, the part tracking program 300 may select less than Z welds, in an attempt to identify the part 236 being made before all the welds 234 are performed. In some examples, the part tracking program 300 may initiate an instance of the initial/final weld hypothesis block 500 at block 804 to determine where to start and/or end the Z weld selection. In examples where block 800 is applied in real time as welding is performed and welds 234 are identified, the part tracking program 300 may determine that the first weld 234 identified after the last part 236 finishes is an initial weld 234*i*, and start at that initial weld 234*i*.

In the example of FIG. 8, the part tracking program 300 proceeds to block 806 after block 804. At block 806, the part tracking program 300 selects N consecutive welds 234 of the Z consecutive welds 232 that have yet to be labeled as belonging to a part 236 of the identified parts 224, and yet to be analyzed using the currently selected part model(s) 232. In some examples, N may initially be equal to X (of the X-Z number range of the welds 234). In examples where block 800 is applied in real time as welding is performed and welds 234 are identified, the part tracking program 300 may initially set N to be equal to one. In some examples, the part tracking program 300 may initiate an instance of the initial/final weld hypothesis block 500 at block 804 to determine where to start and/or end the N weld selection. In examples where block 800 is applied in real time as welding is performed and welds 234 are identified, the part tracking program 300 may determine that the first weld 234 identified after the last part 236 finishes is an initial weld 234*i*, and start at that initial weld 234*i*.

In the example of FIG. 8, the part tracking program 300 proceeds to block 808 after block 806. At block 808, the part tracking program 300 analyzes the N consecutive welds 234 selected at block 806 using the selected part model(s) 232. This analysis may take different forms depending on the type of part model(s) 232.

For example, where the part model 232 is a data set collection, the part tracking program 300 may perform a K nearest neighbor (KNN) analysis to determine which K (e.g., 5, 10, 15, etc.) parts 236 of the data set collection are "nearest" to the N consecutive welds 234. In some examples, K may be a default value stored in memory. In some examples, the part tracking program 300 may determine K based on one or more known constraints 226 and/or feature characteristics 220. In some examples, the part tracking program 300 may determine which type part 236 makes up the majority of the K "nearest" parts 236. In some examples, the part tracking program 300 may determine that the N consecutive welds 234 were used to assemble that same type of part 236. In some examples, the KNN analysis may be particularly useful when analyzing welds 234 in real time, as the "distance" calculations can be easily scaled to accommodate fewer welds 234 than would normally be in a fully completed part 236.

In some examples, the part tracking program 300 may require that the KNN analysis satisfy certain criteria before relying on the KNN analysis. For example, the part tracking program 300 may require that at least a threshold number of the K nearest neighbors be within a certain threshold distance of the N consecutive welds 234. In some examples, the part tracking program 300 may base the criteria on one or more known constraints 226 and/or feature characteristics 220. In some examples, the part tracking program 300 may determine that the KNN analysis is unreliable if the criteria are not met.

As another example, the part tracking program 300 may perform a statistical analysis, such as where the one or more part models 232 are statistical models. In some examples, the statistical analysis may analyze the N consecutive welds 234 in view of one or more statistical part models 232, and determine, using statistical calculations, the probability that a particular part model 232 corresponds to the N consecutive welds 234. In some examples, the part tracking program 300 may determine that the N consecutive welds 234 were used to assemble a part 236 of a type corresponding to the particular part model 232 with the highest probability.

In some examples, the part tracking program 300 may use Bayesian statistical analysis. In some examples, the part tracking program 300 may require the statistical analysis satisfy certain criteria before relying on the statistical analysis. For example, the part tracking program 300 may require at least a threshold number of part models 232 have a probability of higher than a threshold before relying on the statistical analysis. In some examples, the part tracking program 300 may base the criteria on one or more known constraints 226 and/or feature characteristics 220. In some examples, the part tracking program 300 may determine that the statistical analysis is unreliable if the criteria are not met.

As another example, where the one or more part models 232 are one or more neural nets, the part tracking program 300 may simply pass the N consecutive welds 234 to the neural net and analyze the output. In some examples, the neural net may output the probability that the N consecutive welds correspond to that particular neural net part model 232 (or, where the neural net 232 has been trained on data from several different types of parts 236, the probability that the N consecutive welds correspond to a particular part type). In some examples, the part tracking program 300 may determine that the N consecutive welds 234 were used to assemble a part 236 of a type corresponding to the highest probability. In some examples, the part tracking program 300 may require the neural net analysis satisfy certain criteria before relying on the analysis, similar to that which is discussed above with respect to the statistical analysis.

In the example of FIG. 8, the part tracking program 300 proceeds to block 810 after block 808. At block 810, the part tracking program 300 increments N. In some examples, N may be incremented by 1. In some examples, the increment may be based on one or more known constraints 226 and/or feature characteristics 220. In some examples, N may be incremented to the next appropriate integer (e.g., if the part models 232 represent parts 236 having 6 and 8 welds 234, N may be incremented from 6 to 8, rather than 6 to 7). In some examples, N may be decremented instead of incremented (with N beginning at Z rather than X).

In the example of FIG. 8, the part tracking program 300 proceeds to block 810 after block 808. At block 810, the part tracking program 300 determines whether the newly incremented N value is greater than Z (or less than X where N is decremented). As shown, the part tracking program 300 returns to block 806 if the new N value is not greater than Z (or less than X where N is decremented instead).

In the example of FIG. 8, the part tracking program 300 proceeds to block 814 after block 812 if the part tracking program 300 determines the new N value is greater than Z (or less than X where N is decremented instead). At block 814, the part tracking program 300 determines whether there was a reliable determination/match from block 808. If so, the part tracking program 300 proceeds to block 816, where the N consecutive welds are identified/labeled as (and/or associated with) the type of part 236 corresponding to the "best" match of block 808 (e.g., highest probability and/or majority nearest neighbors). In some examples, the new part 236 will be added to the identified parts 224. In some examples, the part tracking program 300 will determine a part ID and/or part specific feature characteristics 220 and associate them with the part 236.

In the example of FIG. 8, the part tracking program 300 proceeds to block 818 after block 816. As shown, the part tracking program 300 proceeds to block 818 after block 814 as well if the part tracking program 300 determines there was not a reliable determination/match from block 808. At block 818, the part tracking program 300 determines whether there are any other groups of Z consecutive welds 234 that have yet to be analyzed in view of the selected part model(s) 232 or identified as parts 236. If so, then the part tracking program 300 returns to block 804 after block 818.

In the example of FIG. 8, the part tracking program 300 proceeds to block 820 after block 18 if the part tracking program 300 determines there are not any other groups of Z consecutive welds 234. At block 820, the part tracking program 300 determines whether there are any other part models 232 selected at block 308 that have yet to be applied. If so, then the part tracking program 300 proceeds to block 822 where the part tracking program 300 selects one or more different part models 232 and/or determines a new X-Z range. As shown, the part tracking program 300 returns to block 818 after block 822. As shown, the apply part model(s) block 800 of the part tracking program 300 ends after block 820 if the part tracking program 300 determines there are no other part models 232 selected at block 308 that have yet to be applied.

The part tracking system 200 disclosed herein uses machine learning techniques to identify parts 236, and/or determine the characteristics of parts 236, repeatedly assembled via one or more welds 234 in a welding cell 101. Identifying parts 236 assembled from the welds 234 may make it possible to do part based analytics (e.g., related to part quality, cost, production efficiency, etc.), as opposed to just weld 234 based analytics. Also, the system can automatically learn which parts 236 are being created (though it may take some time to accumulate enough data). This results in the eventual ability to recognize, monitor, and track parts 236 in real time, as they are created; thereby reducing the expertise, time, and personnel required to accurately configure automatic part tracking systems.

The present methods and/or systems may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, a part, as used herein, may refer to a physical item that is prepared and/or produced through a welding-type process and/or operation, such as, for example, by welding two or more workpieces together. In some contexts, a part may refer to data stored in non-transitory memory that is representative of a physical item prepared and/or produced through a welding-type process and/or operation.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A system, comprising:
   processing circuitry; and
   memory circuitry comprising computer readable instructions which, when executed, cause the processing circuitry to:
      determine a type of part assembled via first consecutive welds of a plurality of welds based on an analysis of one or more feature characteristics of the plurality of welds, the analysis using one or more machine learning techniques and a comparison of at least some first characteristics of the first consecutive welds with at least some model characteristics of a part model of the type of part; and
   a user interface configured to output the type of part assembled via the first consecutive welds, or instructions that guide an operator through assembly of the type of part assembled via the first consecutive welds.

2. The system of claim 1, wherein the memory circuitry further comprises computer readable instructions which, when executed, cause the processing circuitry to:
   identify the plurality of welds based on data captured by a welding-type power supply or one or more sensors positioned in, on, or proximate the welding-type power supply, a work clamp, a welding torch, a wire feeder, or a gas supply, and
   determine the one or more feature characteristics of the plurality of welds based on the data captured.

3. The system of claim 1, wherein the memory circuitry comprises computer readable instructions which, when executed, further cause the processing circuitry to:
   update the part model of the type of part using at least some first characteristics of the one or more feature characteristics, wherein the first consecutive welds are associated with the first characteristics, and
   apply the part model to second characteristics of the one or more feature characteristics to identify second consecutive welds that match the part model.

4. The system of claim 1, wherein the one or more machine learning techniques include a distance metric, a statistical analysis, a rule based analysis, a clustering analysis, a correlation analysis, or a neural net technique, and the part model comprises a neural network representation of the type of part, a data set comprising measured data relating to assembly of the type of part, or a statistical representation of the type of part.

5. The system of claim 3, wherein the comparison comprises a first comparison, and the memory circuitry comprises computer readable instructions which, when executed, further cause the processing circuitry to:
   determine whether the second consecutive welds match the part model based on a second comparison of the second characteristics with one or more model characteristics of the part model, and
   in response to determining the second consecutive welds do match the model, associate the second consecutive welds with the type of part of the part model.

6. The system of claim 5, wherein the comparison comprises a first comparison, and the memory circuitry comprises computer readable instructions which, when executed, further cause the processing circuitry to analyze a quality of a part assembled by the second consecutive welds via a second comparison of the second characteristics with ideal feature characteristics, wherein the ideal feature characteristics comprise one or more statistical averages or standard deviations, or the ideal feature characteristics are determined based on the part model.

7. The system of claim 1, further comprising a welding-type power supply comprising the processing circuitry, the memory circuitry, and power conversion circuitry configured to convert input power to welding-type output power.

8. The system of claim 5, wherein the memory circuitry comprises computer readable instructions which, when executed, further cause the processing circuitry to analyze a production metric or a cost metric of a part assembled by the one or more other consecutive welds, the user interface being configured to output the production metric or the cost metric.

9. The system of claim 5, wherein the memory circuitry comprises computer readable instructions which, when executed, further cause the processing circuitry to:
   predict a part type of a next part assembled via one or more new welds based on the type of part assembled by the second consecutive welds,
   output, via the user interface, directions that guide an operator through assembly of the part type,
   determine whether one or more new feature characteristics of the one or more new welds are within one or more threshold deviations of one or more expected feature characteristics for the part type, and
   in response to determining the one or more new feature characteristics are not within one or more threshold deviations of the one or more expected featured characteristics, output a notification.

10. The system of claim 3, wherein the comparison comprises a first comparison, the part model comprises a first part model, and the memory circuitry comprises computer readable instructions which, when executed, further cause the processing circuitry to:
    determine whether the one or more second consecutive welds match the first part model based on a second comparison of the second characteristics with one or more first part model characteristics of the first part model, and
    in response to determining the one or more second consecutive welds do not match the first part model, determine whether the one or more second consecutive welds match a second part model based on a third comparison of the second characteristics with one or more second part model characteristics of the second part model.

11. A method, comprising:
    determining, via processing circuitry, a type of part assembled via first consecutive welds of a plurality of welds based on an analysis of one or more feature characteristics of the plurality of welds, the analysis using one or more machine learning techniques and a comparison of at least some first characteristics of the first consecutive welds with at least some model characteristics of a part model of the type of part; and outputting, via a user interface, the type of part assembled via the first consecutive welds, or instructions that guide an operator through assembly of the type of part assembled via the first consecutive welds.

12. The method of claim 11, wherein the method further comprises:

identifying, via the processing circuitry, the plurality of welds based on data captured by a welding-type power supply or one or more sensors positioned in, on, or proximate the welding-type power supply, a work clamp, a welding torch, a wire feeder, or a gas supply; and determining, via the processing circuitry, the one or more feature characteristics of the plurality of welds based on the data captured.

13. The method of claim 11, further comprising:

constructing a updating the part model of the type of part using at least some first characteristics of the one or more feature characteristics, wherein the first consecutive welds are associated with the first characteristics; and applying the part model to second characteristics of the one or more feature characteristics to identify second consecutive welds that match the part model.

14. The method of claim 11, wherein the one or more machine learning techniques include a distance metric, a statistical analysis, a rule based analysis, a clustering analysis, a correlation analysis, or a neural net technique, and the part model comprises a neural network representation of the type of part, a data set comprising measured data relating to assembly of the type of part, or a statistical representation of the type of part.

15. The method of claim 13, wherein the comparison comprises a first comparison, the method further comprising:

determining whether the second consecutive welds match the part model based on a second comparison of the second characteristics with one or more model characteristics of the part model; and in response to determining the second consecutive welds do match the part model, associate the second consecutive welds with the type of part of the part model.

16. The method of claim 15, the comparison comprises a first comparison, the method further comprising analyzing a quality of a part assembled by second consecutive welds via a second comparison of the second characteristics with ideal feature characteristics, wherein the ideal feature characteristics comprise one or more statistical averages or standard deviations, or the ideal feature characteristics are determined based on the part model.

17. The method of claim 11, wherein a welding-type power supply comprises the processing circuitry, the welding-type power supply further comprising power conversion circuitry that is configured to convert input power to welding-type output power.

18. The method of claim 15, further comprising analyzing a production metric or a cost metric of a part assembled by the one or more other consecutive welds; and outputting the production metric or the cost metric via the user interface.

19. The method of claim 15, further comprising:

predicting a part type of a next part assembled via one or more new welds based on the type of part assembled by the second consecutive welds;

outputting, via the user interface, directions that guide an operator through assembly of the part type;

determining whether one or more new feature characteristics of the one or more new welds are within one or more threshold deviations of one or more expected feature characteristics for the part type; and in response to determining the one or more new feature characteristics are not within one or more threshold deviations of the one or more expected featured characteristics, output a notification.

20. The method of claim 13, wherein the comparison comprises a first comparison and the part model comprises a first part model, the method further comprising:

determining whether the one or more second consecutive welds match the first part model based on a second comparison of the second characteristics with one or more first part model characteristics of the first part model; and in response to determining the one or more second consecutive welds do not match the first part model, determining whether the one or more second consecutive welds match a second part model based on a third comparison of the second characteristics with one or more second part model characteristics of the second part model.

* * * * *